(12) United States Patent
Olding et al.

(10) Patent No.: US 6,970,597 B1
(45) Date of Patent: Nov. 29, 2005

(54) METHOD OF DEFINING COEFFICIENTS FOR USE IN INTERPOLATING PIXEL VALUES

(75) Inventors: Benjamin P. Olding, Redwood City, CA (US); Ricardo J. Motta, Palo Alto, CA (US)

(73) Assignee: PIXIM, Inc., Mountain View, CA (US)

( * ) Notice: Subject to any disclaimer, the term of this patent is extended or adjusted under 35 U.S.C. 154(b) by 874 days.

(21) Appl. No.: 10/006,974

(22) Filed: Dec. 5, 2001

(51) Int. Cl.[7] .............................................. G06K 9/00
(52) U.S. Cl. ................. 382/167; 382/279; 382/300; 358/273
(58) Field of Search ................. 382/167, 260, 382/266, 279, 300; 348/272, 273, 279, 280

(56) References Cited

U.S. PATENT DOCUMENTS

| | | | |
|---|---|---|---|
| 3,971,065 A | 7/1976 | Bayer ........................... | 358/41 |
| 4,642,678 A | 2/1987 | Cok ............................. | 358/44 |
| 5,373,322 A | 12/1994 | Laroche et al. ............. | 348/273 |
| 5,475,769 A | 12/1995 | Wober et al. ............... | 382/167 |
| 5,629,734 A | 5/1997 | Hamilton, Jr. et al. ...... | 348/222 |
| 5,901,242 A * | 5/1999 | Crane et al. ................ | 382/166 |

OTHER PUBLICATIONS

Brainard, David H., "An Ideal Observer for Appearance: Reconstruction from Samples," (Dec. 1995) pp. 1-19.

* cited by examiner

*Primary Examiner*—Phuoc Tran
(74) *Attorney, Agent, or Firm*—Carmen C. Cook; Patent Law Group LLP

(57) ABSTRACT

A method for generating coefficients for a set of convolution kernels for use in interpolating pixel values in an image sensor is described. The coefficients are computed by applying a constraint matrix specifying one or more constraints. The method includes generating ideal sensor data representative of a test image in a first color plane, generating sensor data of the test image, generating f data matrices including pixel data from multiple neighborhoods of pixels in the pixel array, and determining the coefficients for f convolution kernels using the ideal sensor data, the f data matrices and by applying one or more constraints. The use of a constraint matrix greatly simplifies the computation of the coefficients and can be applied in image processing to generate a high quality full color image.

20 Claims, 8 Drawing Sheets

METHOD OF DEFINING COEFFICIENTS FOR USE IN INTERPOLATING PIXEL VALUES

BACKGROUND OF THE INVENTION

1. Field of the Invention

The invention relates to image processing methods and techniques, and more particularly to a method for defining coefficients of a convolution kernel for use in interpolating unknown pixel values.

2. Description of the Related Art

Digital cameras use an image sensor or a photosensitive device that is sensitive to a broad spectrum of light to capture an image of a scene. The photosensitive device reacts to light reflected from the scene and can translate the strength of that light into electronic signals that are digitized. Generally, an image sensor includes a two-dimensional array of light detecting elements, also called pixels, and generates electronic signals, also called pixel data, at each light detecting element that are indicative of the intensity of the light impinged upon each light detecting element. Thus, the sensor data generated by an image sensor is often represented as a two-dimensional array of pixel data.

For color applications, digital cameras are either implemented as multiple-image-sensor devices or single-image-sensor devices. In a multiple-image-sensor device, a digital camera or a video camera includes multiple image sensors (usually three), each sensor disposed to sense a different spectrum of the visible light (such as red, green and blue). Multiple-image-sensor devices are more complex and require precise optical design to ensure correct image registration. Therefore, the single-image-sensor implementation is more prevalent in digital cameras today.

To capture a color image in a single-image-sensor digital camera, a pattern of selectively transmissive filters is laid on top of the image sensor so that different groups of pixels are made to sense different color ranges. For example, a pattern of three types of filters may be used to sense three color ranges, such as the red, green and blue range of the visible spectrum. Alternately, the filters can be arranged in a "Bayer pattern" including individual luminance and chrominance sensing elements. For example, a four-color Bayer pattern including green1 and green2 luminance sensing elements, and red and blue chrominance sensing elements can be used. U.S. Pat. No. 3,971,065 to Bayer describes a color image sensor using an array of luminance and chrominance sensitive elements. The arrangement of color sensing elements in the color imaging array of the '065 patent is now commonly referred to as the "Bayer pattern."

In a single-image-sensor digital camera, each pixel location is disposed to sample only one color component of the scene. Therefore, at each pixel location, pixel values for the other color components are missing. However, a full color image is usually represented by three set of pixel values, one set of pixel values for each of the three primary colors (such as red, green and blue) at every pixel location. Therefore, to create a full color picture from a single-image-sensor digital camera, an interpolation process is performed amongst the pixels to determine interpolated pixel values at each pixel location for the missing color components.

FIG. 1 illustrates the interpolation process for creating a full color image from sensor data captured using an image sensor overlaid with a pattern of color filters. Referring to FIG. 1, a pixel array 10 represents a portion of an image sensor having M rows and N columns of pixels. Specifically, pixel array 10 depicts a 5×5 neighborhood of pixels in the image sensor. A Bayer pattern of color filters is superimposed on pixel array 10 for capturing different color components of a scene. In the present illustration, a four-color Bayer pattern is used including a red filter superimposed on a pixel 12, a green1 filter superimposed on a pixel 14, a green2 filter superimposed on a pixel 16, and a blue filter superimposed on a pixel 18. This filter pattern repeats throughout the entire image sensor so that each pixel generates pixel data indicative of the impinging light intensity filtered by the respective color filter.

In FIG. 1, a full color image is represented in the RGB color space including a red color plane 20, a green color plane 22 and a blue color plane 24. A color pixel in the full color image can be expressed as a vector of pixel values consisting of pixel values for the red, green and blue color planes. For instance, a color pixel C(i, j) in a full color image may be expressed as follows:

$$C(i, j) = [R(i, j) G(i, j) B(i, j)]^T,$$

where (i, j) are coordinates of a pixel in the image sensor, and R, G and B represent the pixel values for the respective color pixel in each of the three color planes. The interpolation process operates on the pixel data in pixel array 10 which includes pixel data of different colors sampled at different pixel locations and determines the missing pixel values so that each pixel location in pixel array 10 is represented by pixel values in each of three color planes 20, 22, 24 in the full color image.

Techniques for performing interpolation, sometimes referred to as "demosaicing," are known in the art. For example, U.S. Pat. No. 4,642,678 to Cok, U.S. Pat. No. 5,373,322 to Laroche et al., and U.S. Pat. No. 5,475,769 to Wober et al. describe various methods for recovering missing pixel values from sampled color image data. The Wober patent describes a common approach using a convolution kernel to compute missing pixel values for each pixel location based on the pixel values of a neighborhood of pixels surrounding each pixel location. For an n×n neighborhood of pixels, the convolution kernel is an n×n set of coefficients.

FIG. 2 illustrates the interpolation process on a 5×5 neighborhood of pixels using a 5×5 convolution kernel. Referring to FIG. 2, pixel array 30 is a 5×5 neighborhood of pixels surrounding a center pixel 32. Pixel array 30 is overlaid with a Bayer filter pattern including four types of color filters (that is, red, blue, green1 and green2) in the same manner as pixel array 10 in FIG. 1. In the present illustration, center pixel 32 has been superimposed with a red filter. Therefore, the pixel value captured by center pixel 32 (shown as a value of "1") represents the red color component of the light impinged upon that pixel location. Because the color of a scene generally does not change abruptly between adjacent pixel locations and also because the optics of the imaging device will always blur the impinging light so that a beam of light is spread out to adjacent pixels, the neighborhood of pixels surrounding center pixel 32 can be used to recover pixel values of the missing color components at center pixel 32.

In the interpolation process, a different kernel of coefficients is used for each color plane and for each filter pattern. In the present illustration, the missing pixel values to be reconstructed from the neighborhood of pixels are pixel values for the green and the blue color components. FIG. 2 illustrates a convolution kernel 34 for determining the missing pixel value for a given color plane, such as the green color component, of center pixel 32. An interpolated pixel value 36 is determined by multiplying each pixel value in the 5×5 neighborhood of pixels by its corresponding coefficient in convolution kernel 34, such as by performing a matrix multiplication. The products from the matrix multiplication operation are summed to arrive at the interpolated pixel value 36 for the green color component of center pixel 32 which in this case is 2.81.

The interpolation process requires a set of coefficients to be determined for each color plane in the full color image and for each type of filter patterns used by the image sensor. The Wober patent describes a method for determining a set of weighting coefficients using a linear minimum mean square error solution of a matrix and vector expression. The matrix and vector expression defines the relationship between a neighborhood of pixel values and the actual values of the same neighborhood of pixels for a particular color component. Other methods typically involve defining the coefficients manually based on the optical properties of light and the filter characteristics. The conventional methods for generating the coefficients of a convolution kernel are either computationally intensive or are imprecise. In general, the conventional methods do not provide acceptable interpolated pixel values and the resultant image often includes color distortion or fringes. Thus, an improved method for generating coefficients for a convolution kernel is desired.

SUMMARY OF THE INVENTION

According to one aspect of the present invention, a method for generating coefficients for a set of convolution kernels for use in interpolating pixel values in an image sensor is described. The coefficients are computed by applying a constraint matrix specifying one or more constraints.

In one embodiment, the image sensor includes a pixel array overlaid with a pattern of f selectively transmissive filters so that each pixel element of the pixel array is disposed to capture only one of the multiple color spectra of visible light. The coefficient computation method includes generating ideal sensor data representative of a test image in a first color plane and generating sensor data of the test image. The test image includes multiple colors and, in one embodiment, is a random color noise image. The sensor data are indicative of an image of the test image captured using the image sensor. Generally, the sensor data is represented as a two dimensional array of pixel data.

The method continues with generating f data matrices. Each data matrix includes pixel data from multiple neighborhoods of pixels in the pixel array. Each row of the data matrix includes pixel data of one neighborhood of pixels. Each neighborhood of pixels has m rows and n columns and surrounds a center pixel. Each data matrix includes pixel data corresponding to one of the f selectively transmissive filters superimposed on the center pixel of each neighborhood of pixels.

Then, the method proceeds with determining the coefficients for f convolution kernels using the ideal sensor data, the f data matrices and by applying one or more constraints.

According to another aspect of the present invention, the method for determining the coefficients using the ideal sensor data, the f data matrices and by applying one or more constraints includes forming a diagonalized matrix using the f data matrices, forming f ideal matrices based on the ideal sensor data, each of the f ideal matrices including ideal sensor data associated with a respective one of the f selectively transmissive filters superimposed on the center pixel of each neighborhood of pixels, generating a constraint matrix based on the one or more constraints, the constraints being expressed as linear equations in terms of one or more parameters, multiplying the diagonalized matrix with the constraint matrix to generate a constrained data matrix, determining using least square regression the one or more parameters based on the constrained data matrix and the ideal sensor data, and multiplying the constraint matrix and the one or more parameters to generate the coefficients.

The present invention is better understood upon consideration of the detailed description below and the accompanying drawings.

BRIEF DESCRIPTION OF THE DRAWINGS

In the present disclosure, like objects which appear in more than one figure are provided with like reference numerals.

DETAILED DESCRIPTION OF THE PREFERRED EMBODIMENTS

In accordance with the principles of the present invention, a method for defining coefficients for a set of convolution kernels for use in interpolating pixel values in a color image sensor is described. The coefficients are computed using a constraint matrix specifying one or more constraints. The constraints are selected to enhance the image quality of the resultant full color image to be derived from the image data captured by the color image sensor. For example, a set of constraint conditions can be designed to improve the color uniformity and edge uniformity of the full color image. The use of a constraint matrix greatly simplifies the computation of the coefficients and allows linear least square regression to be used only for solving a small number of parameters from which the coefficients can be derived. The coefficients for a set of convolution kernels defined using the method of the present invention can be applied in image processing to generate a high quality full color image.

Method Overview

The method of the present invention can be applied to define coefficients for use in a variety of color imaging devices, such as a digital camera, for processing pixel data captured by the color imaging device. As described above, pixel value interpolation is performed in a single-image-sensor imaging device for reconstructing pixel values so that each pixel location in the image sensor is represented by pixel values in each of the color planes constituting the full color image.

In a single-image-sensor imaging device, an image sensor is used to sense multiple color spectra of the visible light. Such image sensor, referred herein as a color image sensor, includes a pattern (or a mosaic) of color filters superimposed and in registration with each pixel element of the color image sensor, so that each pixel element is disposed to sense a selected color defined by the filter pattern. For a given filter pattern, a set of convolution kernels is defined where each convolution kernel contains coefficients for interpolating pixel values from one filter color in the filter pattern to one color plane of the full color image.

In accordance with the present invention, the coefficient computation method can be used to interpolate pixel data captured using any type of filter patterns to derive interpolated pixel values in any color system used by the full color image. Commonly used color filter patterns include the red-green-blue (RGB) pattern or a four-color Bayer pattern having green1, green2, red and blue color components. Other four color Bayer patterns can also be used, such as the Cyan, Yellow, Magenta and Green color filter pattern.

Figure 1:
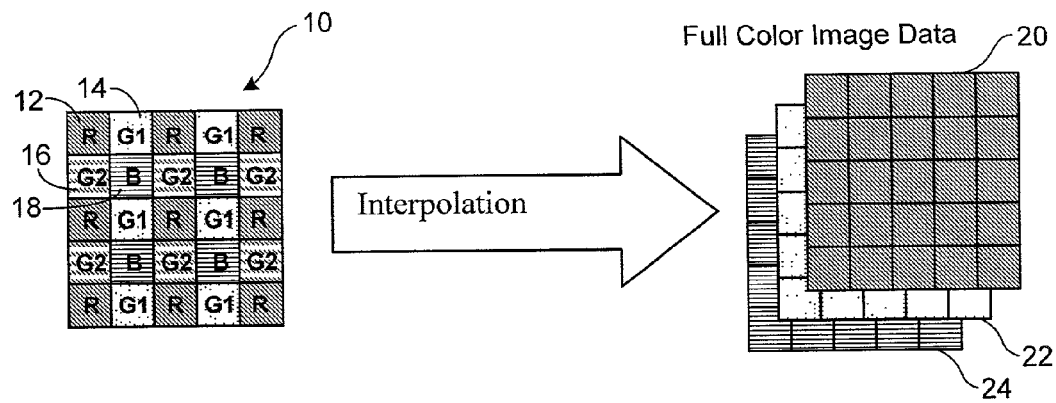
FIG. 1 illustrates the interpolation process for creating a full color image from sensor data captured using an image sensor overlaid with a pattern of color filters.

Through interpolation, the pixel values captured by an image sensor can be translated into a full color image expressed in any system of colors. In FIG. 1, the full color image is represented by the RGB color system in three color planes (red plane 20, green plane 22 and blue plane 24). Other commonly used color systems include the luminance-chrominance (Y/Cb/Cr) system, the YUV system, the HSV (or HIS) system, and the XYZ system. In particular, the luminance-chrominance color system can be advantageously applied to provide superior image quality, free of unwanted image artifacts such as color fringes or nonuniformity. In the luminance-chrominance color system, the luminance (Y) component describes the spatial information of the pixel location while the chrominance (Cb/Cr) components describe the color information of that pixel location. The relationship between the RGB color system and the Y/Cb/Cr color system is well known and one skilled in the art of image processing would appreciate that pixel values in the Y/Cb/Cr color system can be derived from pixel values in the RGB color system using known mathematical relationships. The coefficient computation method of the present invention can be applied to define coefficients for interpolating pixel values in the Y/Cb/Cr color system.

As described above, the coefficient computation method of the present invention can be used to compute coefficients so that any color filter pattern can be mapped to any color system used to represent the full color image. In the present description, the image sensor for which convolution kernels are being defined is assumed to have incorporated a four-color Bayer pattern including color filters denoted as A, B, C and D. The A, B, C and D color filters can represent the green1, green2, red and blue color components, or other suitable color components. Thus, the image sensor of the present embodiment assumes the filter pattern configuration as illustrated by pixel array 10 of FIG. 1. Furthermore, in the present description, the full color image is represented in the RGB color system in three color planes as illustrated in FIG. 1. The full color image thus includes red color plane 20, green color plane 22 and blue color plane 24.

In conventional imaging applications, interpolation is often performed to determine only the missing pixel values, that is, the missing color components of each pixel location. The coefficient computation method of the present invention can be applied in the same manner for defining coefficients to reconstruct the missing pixel values only.

However, according to another aspect of the present invention, the coefficient computation method can be used to define coefficients for use in interpolating pixel values, not only for the missing color components, but for all color components of full color image. Thus, pixel value interpolation can be performed at each pixel location for all of the color planes in the full color image.

Interpolating pixel values for all of the color planes offers numerous advantages not realized by interpolating only missing pixel values. First, image processing operations, such as sharpening or blur correction, can be performed at each pixel location to correct for blurring or other image artifacts introduced by the lens system of the imaging device. Second, interpolating pixel values for all color planes allows a filter pattern in one color space to be mapped to a full color image expressed in another color space. For example, an image sensor can utilize a RGB filter pattern while the full color image can be represented in the Y/Cb/Cr color system. Finally, interpolating all pixel values can be used to transform certain image characteristics of an image, such as the illumination of the image. For example, a scene may be captured under indoor or fluorescent lighting, but ideally the scene should be illuminated by daylight. Interpolation of all pixel values permits such transformation to take place to derive a desired final full color image.

In the present description, it is assumed that interpolation is performed to derive pixel values at each pixel location for all color planes. Thus, for a filter pattern having f color filters and a full color image having s color planes, a total of f×s convolution kernels needs to be defined. In the case where interpolation is performed only for missing pixel values, a total of f×(s−1) convolution kernels are used.

Figure 3:
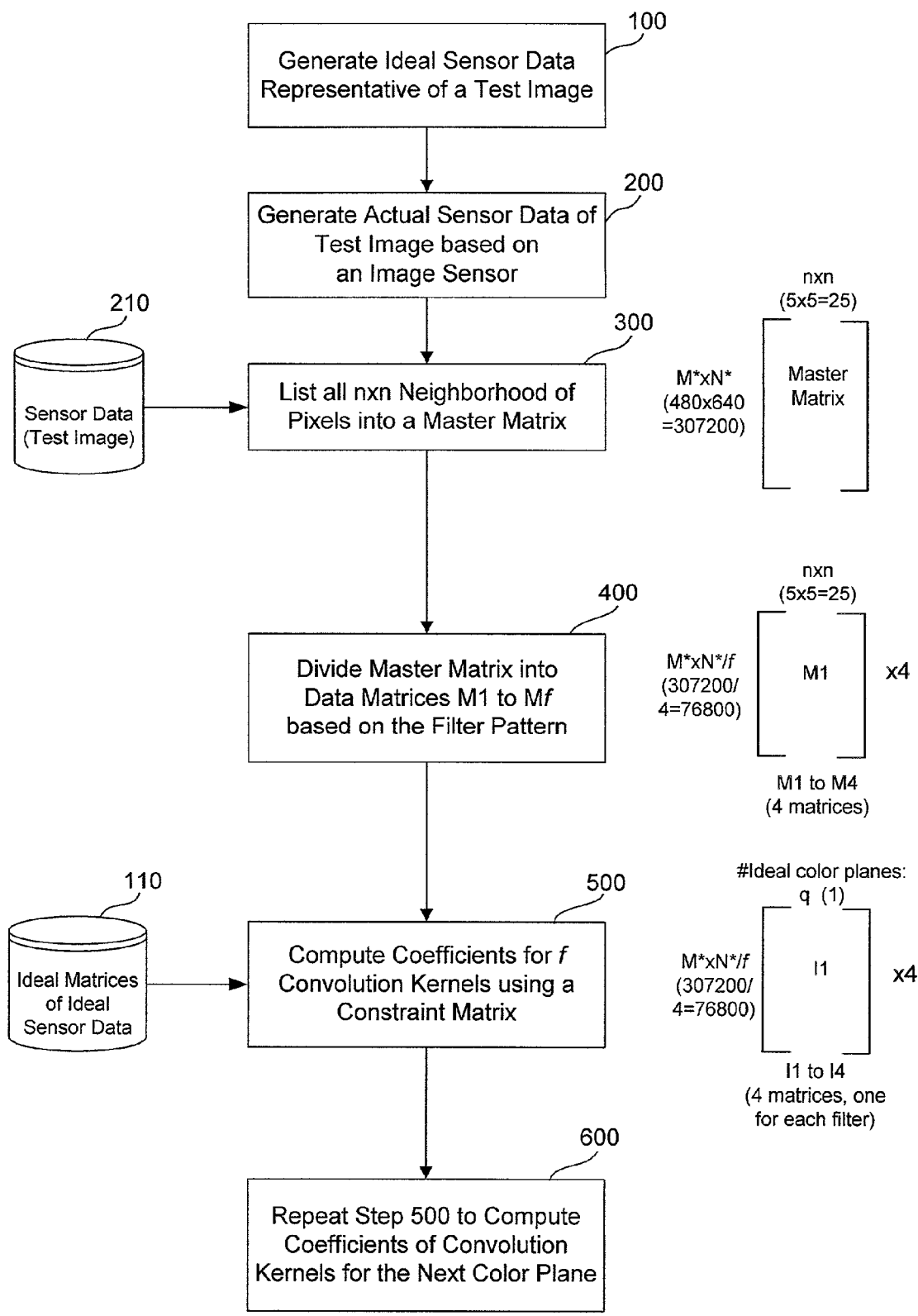
FIG. 3 is a flow chart illustrating the method for defining coefficients according to one embodiment of the present invention.

The operation of the coefficient computation method of the present invention will now be described. FIG. 3 is a flow chart illustrating the method for defining coefficients according to one embodiment of the present invention.

Generate Ideal Sensor Data

Referring to FIG. 3, ideal sensor data representative of a test image is generated (step 100). The test image for use in the method of the present invention can be any images. In the preferred embodiment, the test image is a random color noise image.

A random color noise image is an image including color elements that are spatially and color band decorrelated. Generally, the random color noise image should include all colors of interest in the visible light spectrum and the colors should be randomly positioned and randomly oriented. An optimal test image should include shapes and colors that reflect as close as possible the applications in which the image sensor is used. For instance, the test image should exclude colors or spatial variations which will never appear in typical images captured by the image sensor. Furthermore, the frequency of occurrence of each color component should reflect the actual imaging applications of the image sensor. Thus, if gray scale colors appear twice as frequently as other colors in the applications of interest, then the gray scale colors should be represented more frequently in the test image as well. In one embodiment, a color gamut that weights different colors with different probabilities is used to generate the test image. Thus, colors which will occur with higher probabilities will be included more frequently in the test image than colors of lower probabilities of occurrence.

The random color noise image should also include different spatial components, such as vertical, horizontal and diagonal spatial components. If one spatial component occurs more frequently in a given imaging applications, the frequency of occurrence of that spatial component can be increased to reflect the actual applications.

In the preferred embodiment, the test image is a slightly burred color noise image. Thus, any color in the visible spectrum is equally likely to be included in the test image. The test image can be blurred out using a Gaussian blur function to reduce the occurrence of high frequency spatial patterns.

In the method of the present invention, the ideal sensor data represents the ideal image representation of the test image. The ideal sensor data does not suffer from the imaging artifacts which may afflict an actual image captured by an image sensor. Thus, when the image sensor is used to capture an image of the test image, it is desirable to transform the actual sensor data to as close as possible the ideal sensor data in order to obtain an optimal image.

In the present embodiment, the ideal sensor data are expressed in a matrix format, denoted as Ideal Matrices 110 in FIG. 3. One Ideal Matrix is generated for each filter color of the filter pattern. The structure of the Ideal Matrices will be described in more detail below. In brief, each Ideal Matrix has q columns, where each column represents one color plane in the full color image. In the present illustration, each Ideal Matrix can have up to three columns of ideal sensor data, each column representing the red, green and blue color plane, respectively. The rows of each Ideal Matrix contain the ideal sensor data for all pixel locations in the sensor data. When thus arranged, each column of an Ideal Matrix contains ideal sensor data for a particular color filter which the image sensor should obtain for the specific color plane in the full color image.

Generate Actual Sensor Data

At step 200, actual sensor data of the test image based on the imaging device of interest is generated. The actual sensor data can be generated either by capturing an image of the test image using the imaging device or by simulation. When the actual sensor data is simulated, the sensor data should include all imaging artifacts introduced by the imaging device in the image capturing process. Such artifacts typically include blurring by the lens system, distortion caused by the color filter pattern, optical or electrical cross-talk between the color filters, and noise in the imaging system. For instance, when an image of a white surface is captured, the image sensor turns the white surface into a multi-shaded checkerboard pattern of colors because of the filter pattern. Basically, the actual sensor data reflect how the imaging system distorts the test image in the image capturing process.

Figure 5:
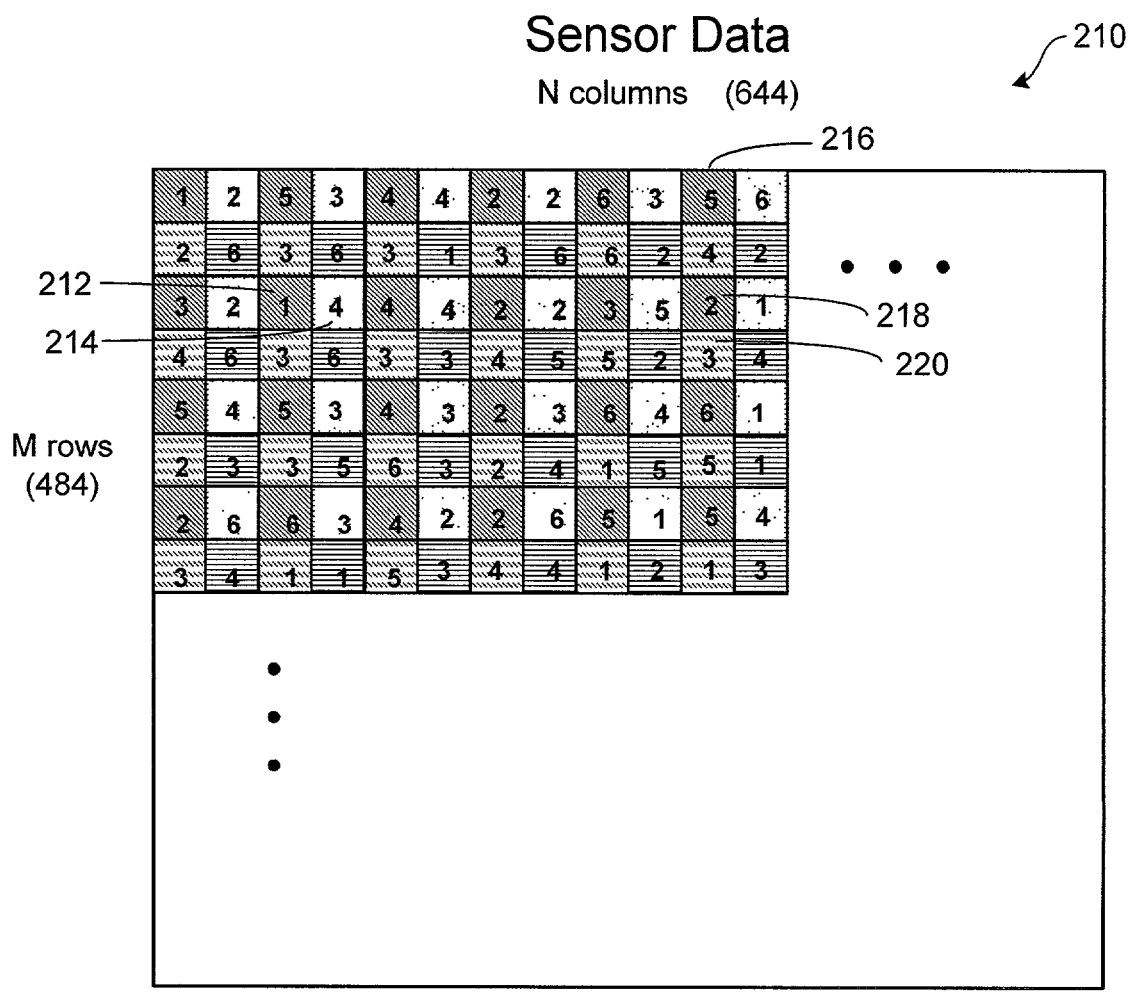
FIG. 5 illustrates a two-dimensional array of sensor data of a test image captured using an image sensor of interest according to one embodiment of the present invention.

Actual sensor data 210 can be represented as a two dimensional array of pixel values, as shown in FIG. 5. When the image sensor of interest has M rows and N columns of pixels, sensor data 210 is an M×N array of pixel values. In the present illustration, sensor data 210 has 484 rows by 644 columns of pixel values. As described above, the image sensor is overlaid with a filter pattern having f filters. Thus, the pixel value at each pixel location represents the integrated light intensity impinged upon that pixel location and filtered by the respective color filter.

Construct a Master Matrix

For each pixel location, except those at the perimeter of the array, an n×n neighborhood of pixel values can be defined using each pixel location as the center pixel. At step 300, a Master Matrix is constructed containing a listing of all n×n neighborhoods of pixel values in sensor data 210. In the present embodiment, pixel locations along the perimeter of the array not sufficient to act as a center pixel to form an n×n neighborhood of pixels are ignored. For example, when n is 5, the two rows and two columns of pixel locations along the perimeter of sensor data 210 are ignored. For an image sensor having M rows by N columns of pixels, the total number of neighborhoods of pixel values is given as follows:

Total No. of Neighborhoods=M*×N*, where $$M^* = \left(M - \text{floor}\left(\frac{n}{2}\right) \times 2\right), \text{ and}$$

$$N^* = \left(N - \text{floor}\left(\frac{n}{2}\right) \times 2\right).$$

The "floor( )" function denotes the smaller integer value of the operand. When the image sensor has 484 row and 644 columns and n is 5, M* is 480 and N* is 640 so that the total number of neighborhood of pixel values is 307200.

Note that in FIG. 3 and other flowcharts to follow, for ease of explanation, the matrices generated by or being operated on in each of the steps are shown alongside the respective steps in the flowcharts. The dimensions of each matrix are shown where the assumed values in the present illustration are given in parentheses. Referring to FIG. 3, the Master Matrix is an M*×N* by n×n matrix and in the present illustration, the Master Matrix is 307,200 rows by 25 columns. Each row of the Master Matrix lists the n×n pixel values surrounding and including each center pixel location. For example, for a pixel 212 in FIG. 5, a row in the Master Matrix contains the 25 pixel values surrounding and including pixel 212 as the center pixel. Similarly, another row in the Master Matrix contains the 25 pixel values surrounding and including a center pixel 214.

Construct Data Matrices

The M*×N* neighborhoods of pixel values can be grouped based on the filter type of the center pixel. For a filter pattern having f filters, the M*×N* neighborhoods of pixel values can be divided into f groups, each group containing the neighborhoods of pixel vales for one filter type. Thus, at step 400, the Master Matrix is divided into f data matrices M1 to Mf according to the types of filters in the filter pattern. Each M1–Mf data matrix has (M*×N*)/f rows and n×n columns.

For example, in the present description, sensor data 210 has a filter pattern including 4 filters. The Master Matrix will be divided into 4 data matrices M1 to M4, each matrix containing all of the neighborhoods of pixel values for one filter type in the filter pattern. Each M1–M4 data matrix has 76,800 rows by 25 columns. Referring to FIG. 5, pixel 212 is associated with a red color filter while pixel 214 is associated with a green1 color filter. Thus, the neighborhood of pixel values for center pixel 212 will be placed in data matrix M1 while the neighborhood of pixel values for center pixel 214 will be placed in data matrix M3, for example.

Structure of the Ideal Matrices

As mentioned above, the ideal sensor data are expressed in matrix format, denoted as Ideal Matrices 110. In fact, Ideal Matrices 110 are formulated in the same manner as data matrices M1 to Mf. Thus, Ideal Matrices 110 include ideal matrices I1 to If, each ideal matrix containing ideal sensor data values for one filter type in the filter pattern. Each I1–If matrix has $(M^* \times N^*)/f$ rows and q columns, where q represents the number of color planes in the full color image. In the present description, it is assumed that the coefficient computation method is used to compute a set of convolution kernels for one color plane only. Thus, q has a value of 1. In the present illustration, Ideal Matrices 110 include ideal matrices I1 to I4, each being a 76,800 by 1 matrix.

For each ideal matrix I1–If and data matrix M1–Mf, there is a set of coefficients which would transform the n×n neighborhood of pixel values in a data matrix M1–Mf to the ideal sensor data value in the corresponding ideal matrix I1–If. As is understood by one skilled in the art, the relationship between data matrices M1 to Mf and ideal matrices I1 to If can be expressed as follows:

$$[M][C]=[I], \quad \text{Eq. (1)}$$

where M represents any one of matrices M1 to Mf, I represents any one of matrices I1 to If, and C is a coefficient matrix having a dimension of n×n rows and q columns. In the present description, C is 25 rows by 1 column. The solution to Equation (1) above provides the coefficients for transforming sensor data for one filter type. Equation (1) is thus repeatedly computed to obtain the coefficients for other filter types in the filter pattern.

For all but the most artificial images, there is no set of coefficients in matrix C which will complete Equation (1) above. Typically, Equation (1) is viewed as a set of over-constrained linear equations and coefficients in matrix C are solved using a least square approach which minimizes the mean square error. However, such least square approach often does not provide a useful set of coefficients for image processing applications because human eyes are not sensitive to mean square errors in images but rather to specific types of image artifacts. Therefore, a useful set of coefficients should transform pixel values in a data matrix M to the ideal values in an ideal matrix I while minimizing or eliminating image artifacts to which the human eyes are sensitive.

Compute Coefficients

Figure 4A:
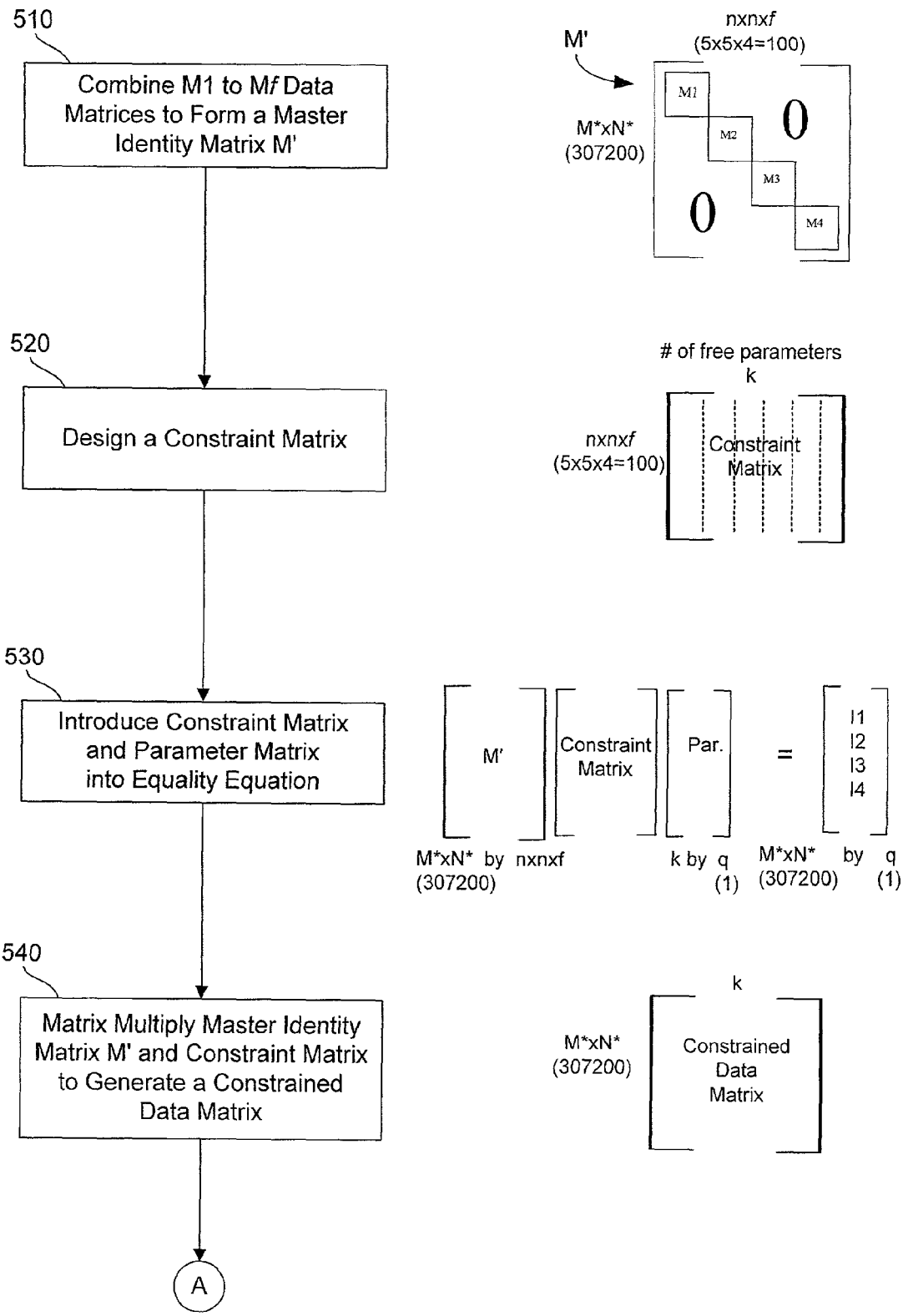
FIGS. 4a and 4b illustrate the steps in computing coefficients for f convolution kernels using a Constraint Matrix according to one embodiment of the present invention.
Figure 4B:
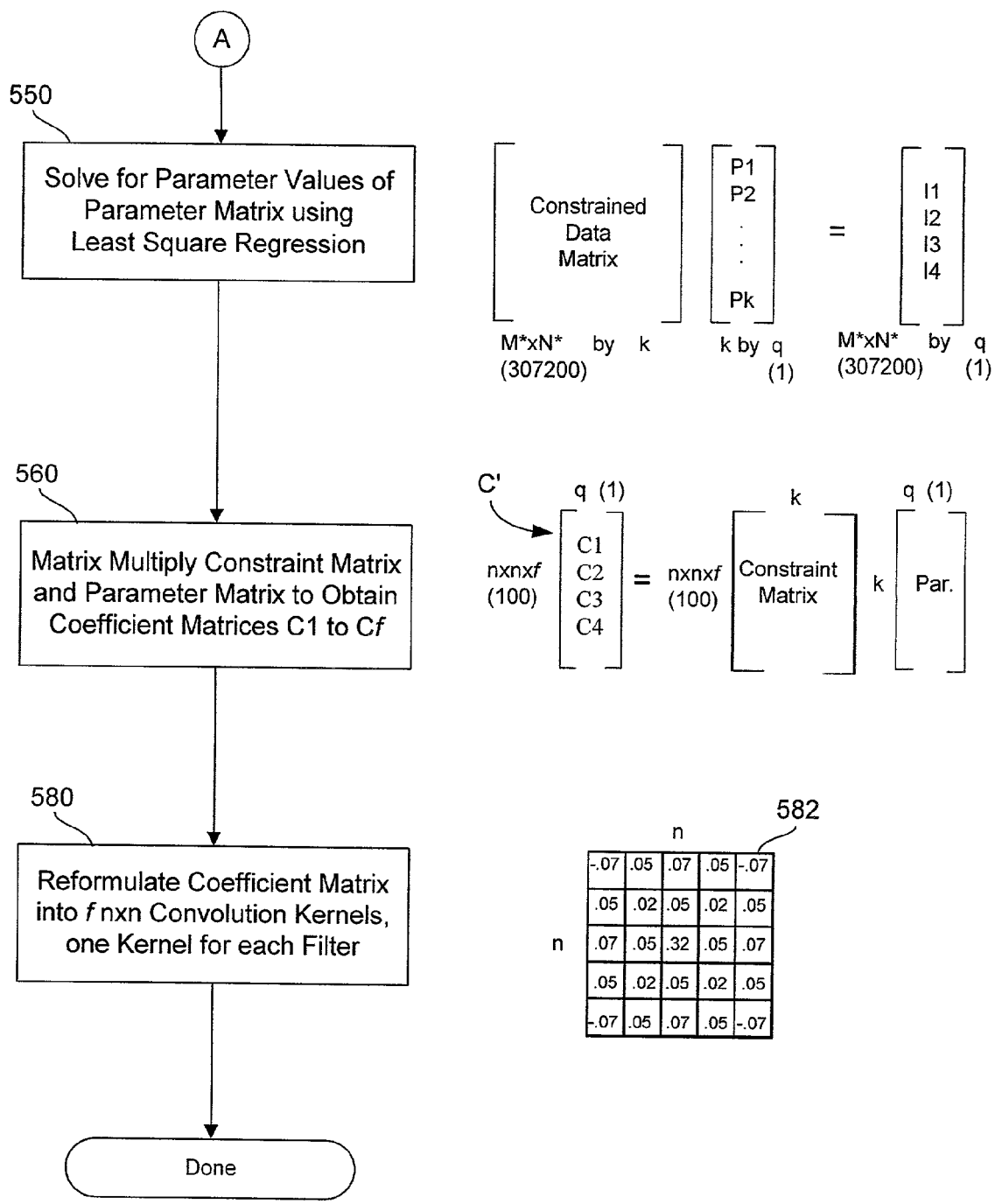

At step 500, the method of the present invention proceeds to compute coefficients for f convolution kernels using a Constraint Matrix. The Constraint Matrix specifies constraint conditions expressed as linear equations involving a limited number of free parameters. Therefore, the use of the Constraint Matrix greatly simplifies the computational burden of solving for the coefficients. More importantly, the constraint conditions are designed so as to obtain a set of coefficients that are effective in minimizing or eliminating unwanted image artifacts. FIGS. 4a and 4b illustrate the steps in computing coefficients for f convolution kernels using a Constraint Matrix (step 500) according to one embodiment of the present invention.

Construct Master Diagonalized Matrix

Conventional methods usually compute coefficients for each filter type separately. However, because each filter type varies spatially in the filter pattern, such conventional methods often generate coefficients that are unsatisfactory. The coefficients may result in undesirable spatial variations in the transformed image. For instance, the human eye is typically sensitive to local changes in contrast. When a set of coefficients for each filter type are solved for independently using a least square approach, each set of coefficients may be able to minimize the mean square error but may also enhance the local contrast. Thus, a smooth wall could appear to have a strong texture. The outline of a window may appear as a zig-zag line with each pixel value along the outline taking on alternating values because adjacent pixels belong to different filter types.

Therefore, while it is sometimes desirable to transform the values in data matrix M as close as possible to values in the corresponding ideal matrix I, it is much more important to ensure that the transformed values provide spatially uniformity even if the transformed values deviate from the ideal values. In accordance with the present invention, contrary to the conventional method, the coefficient computation method solves simultaneously for coefficients for all filter types in the filter pattern. The method of the present invention is thus able to eliminate spatial variations which can result when the coefficients are solved for separately.

Referring to FIG. 4a, at step 510, data matrices M1 to Mf are combined to form a Master Diagonalized Matrix M'. Master Diagonalized Matrix M' is constructed by placing data matrices M1 to Mf along the diagonal entries of matrix M' and placing zeros on all remaining entries. Master Diagonalized Matrix M' as illustrated in FIG. 4a has a dimension of $M^* \times N^*$ rows by n×n×f columns. In the present illustration, matrix M' includes data matrices M1 to M4 along it's diagonal and is a 307,200×100 matrix. The relationship between Master Diagonalized Matrix M' and Ideal Matrices I1 to If can now be expressed as follows for the case of f=4 filters:

$$\begin{bmatrix} M1 & 0 & 0 & 0 \\ 0 & M2 & 0 & 0 \\ 0 & 0 & M3 & 0 \\ 0 & 0 & 0 & M4 \end{bmatrix} \begin{bmatrix} C1 \\ C2 \\ C3 \\ C4 \end{bmatrix} = \begin{bmatrix} I1 \\ I2 \\ I3 \\ I4 \end{bmatrix}, \quad \text{Eq. (2)}$$

where C1, C2, C3, and C4 are four sets of coefficients, each set of coefficients associated with one filter type in the filter pattern. C1, C2, C3, and C4 form a Coefficient Matrix C' have a dimension of n×n×f rows by q columns. In the present description, matrix C' is 100 rows by 1 column. The method of the present invention now proceeds to solve for the coefficients in C1, C2, C3 and C4 in Equation (2) above by applying a Constraint Matrix.

Design a Constraint Matrix

At step 520, a Constraint Matrix for the imaging device of interest is designed. The Constraint Matrix specifies a number of constraint conditions which are expressed in the form of linear equations involving a limited set of free parameters. The considerations on how to design a constraint matrix will be described in more detail below. It is suffice to state here that the constraints are chosen to achieve certain desired imaging effect in the full color image. The imaging effect may include a desired level of spatial uniformity and color uniformity. The Constraint Matrix typically incorporates a multiple number of constraints to achieve the desired imaging result.

Referring to FIG. 4a, the Constraint Matrix has a dimension of n×n×f rows and k columns, where k is the number of free parameters. When the Constraint Matrix is introduced into Equation (2) above (step 530), the Coefficient Matrix C' is replaced by the Constraint Matrix and a Parameters Matrix and the equality in Equation (2) can now be expressed as:

$$\begin{bmatrix} M1 & 0 & 0 & 0 \\ 0 & M2 & 0 & 0 \\ 0 & 0 & M3 & 0 \\ 0 & 0 & 0 & M4 \end{bmatrix} \begin{bmatrix} \text{Constraint} \\ \text{Matrix} \end{bmatrix} \begin{bmatrix} \text{Parameters} \end{bmatrix} = \begin{bmatrix} I1 \\ I2 \\ I3 \\ I4 \end{bmatrix}, \quad \text{Eq. (3)}$$

where the Parameters Matrix contains the free parameters and has a dimensions of k rows by q columns. In the present description, the Parameters matrix is a k×1 matrix. The Coefficient Matrix C' relates to the Constraint Matrix and the Parameters Matrix as follows:

$$\begin{bmatrix} C1 \\ C2 \\ C3 \\ C4 \end{bmatrix} = \begin{bmatrix} \text{Constraint} \\ \text{Matrix} \end{bmatrix} \begin{bmatrix} \text{Parameters} \end{bmatrix}. \quad \text{Eq. (4)}$$

Referring to Equation (3) above, after introducing the Constraint Matrix, only the free parameters in the Parameters Matrix need to be solved. Thus, the solution to Equation (3) is greatly simplified. Specifically, the Parameters matrix is a k×1 matrix when only one color plane is of interest. The introduction of the Constraint Matrix thus greatly reduces the computational burden in computing coefficients.

Compute Constrained Data Matrix

Having established Equation (3) above, the method proceeds to matrix multiply the Master Diagonalized Matrix M' and the Constraint Matrix to generate a Constrained Data Matrix (step 540). After the matrix multiplication, the Constrained Data Matrix has a dimension of M*×N* rows by k columns. In the present description, the Constrained Data Matrix is a 307,200×k matrix. Because the number of free parameters k is typically less than 100, the size of the Constrained Data Matrix is smaller than the Master Diagonalized Matrix M', simplifying subsequent computation. In fact, as will be explained in more detail below, when sufficient constraints are applied, k is typically less than 10 and thus, the number of free parameters to be solved for can be significantly less than the number of coefficients.

After the matrix multiplication, Equation (3) can be expressed as follows:

$$\begin{bmatrix} \text{Constrained} \\ \text{Data} \\ \text{Matrix} \end{bmatrix} \begin{bmatrix} P1 \\ P2 \\ \vdots \\ Pk \end{bmatrix} = \begin{bmatrix} I1 \\ I2 \\ I3 \\ I4 \end{bmatrix}, \quad \text{Eq. (5)}$$

where P1 to Pk denotes the unknown free parameter.

Solve for Free Parameters

Referring to FIG. 4b, Equation (5) can now be solved for the parameter values in the Parameters Matrix using a least square regression approach (step 550). The solution to Equation (5) will minimize the mean square error but is also subject to the constraints imposed by the Constraint Matrix. In this manner, the method of the present invention compute coefficients that meet all of the constraints while providing a transformation as close as possible to the ideal sensor values.

Compute Coefficients from Free Parameters

Having solved for the parameters values (P1 to Pk) in the Parameter Matrix, the coefficients in matrix C' can be derived using Equation (4) above. Thus, at step 560, matrix multiplication of the Constraint Matrix and the Parameters Matrix is performed to provide the f set of coefficients. In the present description, four sets of coefficients C1, C2, C3 and C4 are derived for the four filter type used in the filter pattern.

In the Coefficient Matrix C', each set of C1–C4 coefficients is written as an n×n by q matrix. Each set of coefficients C1–C4 in matrix C' can be formulated into separate n×n convolution kernels (such as kernel 582) for use by the image sensor in subsequent image processing operations (step 580). Of course, step 580 is optional and the format of the convolution kernel is dependent upon the requirements of the image sensor or the imaging device of interest.

Compute Coefficient for Another Color Plane

The process of computing coefficients for f set of convolution kernels in one color plane (step 500) is now completed. Returning to FIG. 3, after step 500, the method of the present invention can proceed to an optional step 600 which repeats the coefficient computation step 500 to compute next set of coefficients for the next color plane. In the present illustration, each coefficient computation step takes into account of only one color plane in the full color image. This is accomplished by setting the number of color planes q in the Ideal Matrixes to 1. The ideal matrixes I1 to I4 each has only one column and each includes ideal sensor data values for only one color plane.

To compute coefficients for f set of convolution kernels for the next color plane, coefficient computation step 500 is repeated and the ideal matrixes I1 to If are formed using ideal sensor values for the next color plane of interest. Coefficient computation step 500 can be repeated as many times as needed to compute coefficients for all the color planes in the full color image.

In the alternate, coefficient computation step 500 can be set up to compute coefficients for all color planes simultaneously. In that case, each ideal matrix I1–If includes q number of columns where each column contains ideal sensor data for each color planes. The computation proceeds as previously described in FIGS. 4a and 4b, except that the Coefficient Matrix C' is now a n×n×f by q matrix, instead of n×n×f by 1, and the Parameters matrix is now a k×q matrix, instead of a k×l matrix. Equation (5) can now be solved for all parameter values in the Parameters Matrix using least square regression.

Although it is feasible to simultaneously solve for coefficients for all color planes, such computation increases the complexity of Equation (5). Therefore, in the preferred embodiment, step 500 is conducted for one color plane at a time and step 500 is repeated for as many times as needed to compute coefficients for each color plane. In some applications, it may be desirable to define convolution kernels only for a selected color plane while the convolution kernels for the other color planes can be generated using other means, such as manually, in order to achieve the desired imaging result. Therefore, coefficient computation step 500 can be advantageously applied to compute coefficients only for those color planes of interest.

Interpolation Using the Coefficients

Figure 6:
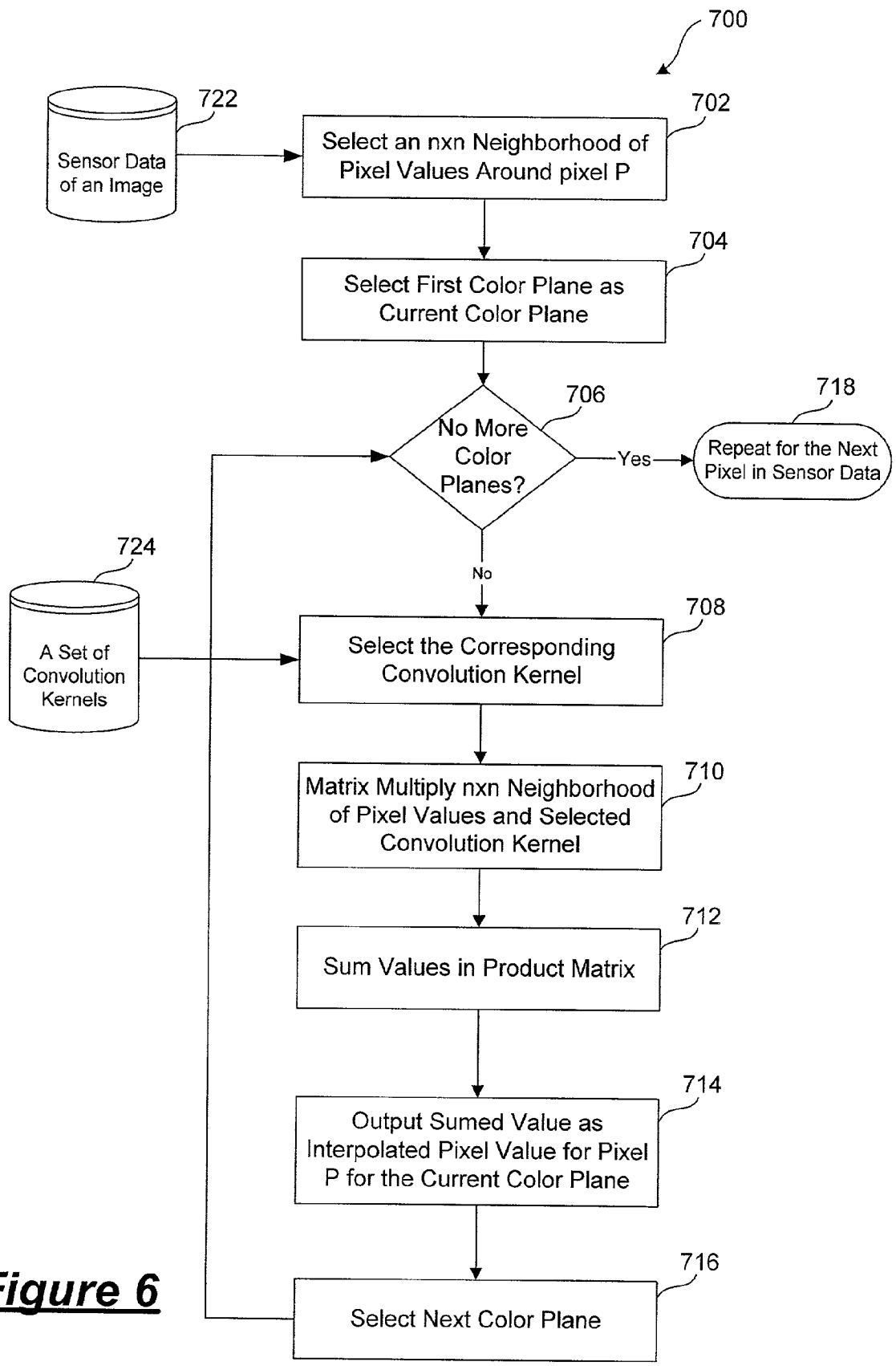
FIG. 6 is a flow chart illustrating an exemplary process for calculating interpolated pixel values using a set of convolution kernels computed using the method of the present invention.

After establishing the convolution kernels for each filter and each color plane, the convolution kernels can be stored in an imaging device for processing sensor data subsequently captured by the imaging device for generating a full color image. FIG. 6 is a flow chart illustrating an exemplary process for calculating interpolated pixel values using a set of convolution kernels computed using the method of the present invention. FIG. 6 is illustrative only and other process for calculating interpolated pixel values can also be used.

Referring to FIG. 6, an imaging device, including an image sensor overlaid with a given color filter pattern, is used to capture an image of a scene and generate sensor data file 722 which is two-dimensional array of pixel values. A set of convolution kernels 724 has been defined for the imaging device using the coefficient computation method of the present invention. The interpolation process 700 is then carried out to calculate the interpolated pixel values for each pixel location and in each color plane to give a full color image. Interpolation process 700 will be described with reference to FIGS. 1, 2, 5 and 6.

First, a center pixel P and its associated n×n neighborhood of pixels are selected from the two-dimensional array of pixel values in sensor data file 722 (step 702). In the present example, n is taken to be 5. The neighborhood of pixel values form a 5×5 pixel array, such as pixel array 30 in FIG. 2. Next, the first color plane in the full color image (such the red color plane 20 of FIG. 1) is selected as the current color plane (step 704). At step 706, process 700 determines if there are any remaining color planes to be processed. If so, process 700 proceeds to step 708 where the convolution kernel for the current color plane and for the color filter associated with center pixel P is selected from the set of convolution kernels 724.

The interpolated pixel value for center pixel P can now be computed. First, the 5×5 neighborhood of pixel values (pixel array 30 in FIG. 2) is multiplied by the selected convolution kernel (kernel 34 in FIG. 2) using matrix multiplication (step 710). The result is a 5×5 product matrix. Then, each value in the product matrix is summed (step 712). The summed value (pixel value 36 in FIG. 2) is outputted as the interpolated pixel value for center pixel P in the current color plane.

Interpolation process 700 continues with selecting the next color plane (step 716). If there is another color plane to process, then steps 708 to 714 are repeated to calculate the interpolated pixel values for the next color plane. If there are no more color plane to select (step 706), then the interpolated pixel values for center pixel P in all color planes have been derived. Process 700 can then proceed to calculate the interpolated pixel value for the next center pixel in the sensor data (step 718). In this manner, interpolated pixel values for all pixel locations in the sensor data for all color planes can be calculated. As described above, pixel locations around the perimeter of the two-dimensional array of sensor data where an n×n neighborhood of pixels cannot be established are ignored. In most cases, only a few rows of sensor data around the perimeter are discarded and the impact on the final full color image is minimal.

The Constraint Matrix

The process of designing a Constraint Matrix will now be described. The motivation behind introducing a Constraint Matrix in the coefficient computation method of the present invention is two fold. First, the Constraint Matrix is introduced to ensure that the coefficients computed are useful and meaningful. Second, applying a Constraint Matrix in the computation process can significantly reduce the computational burden in solving for the coefficients.

Turning first to the use of the Constraint Matrix to provide a set of useful and meaningful coefficients. For the purpose of image processing using interpolation, a set of coefficients is meaningful and useful when the coefficients not only minimize mean square errors but also give pleasing imaging result.

Conventional methods for specifying coefficients are not satisfactory for several reasons. One reason is that the conventional methods specify coefficients for convolution kernels on a kernel by kernel basis. The conventional methods do not consider the relationship between convolution kernels for a given filter pattern, or the different amount of information available to each kernel. Another reason is that conventional methods focus merely on minimizing the mean square error so that the coefficients can transform the actual sensor data very close to the ideal values. For example, a linear least square regression is typically used to solve for a set of coefficients to transform the actual sensor data to its ideal values. While such linear regression can give very mathematically precise solutions, the resulting images are often not visually correct or pleasing. For instance, the accuracy of the convolution kernels is affected by the underlying filter pattern so that the minimum error solution may give each kernel a different precision value. The variation in precision values across the different convolution kernels for a filter pattern results in distortion in the final full color image.

For example, if a wall in an image has one color and is smooth and uniform, the wall should appear as one color and be uniform in the full color image. However, when the convolution kernels for a filter pattern have varying precision values, each interpolated pixel value becomes slightly different than an adjacent pixel value because adjacent pixels are overlaid with different filter types. The resultant full color image may appear to have color variations or texture such as a multi-shaded checkerboard pattern resembling the filter pattern.

In accordance with the present invention, a Constraint Matrix is designed to constrain the convolution kernels for the different filter types in a filter pattern so that the convolution kernels act in conjunction with each other. In this manner, the method of the present invention can specify a set of convolution kernels so that, when applied to interpolation of pixel values, two adjacent interpolated pixel values transformed using two different convolution kernels will be the same when the two adjacent pixels are under the identical stimulus condition.

Figure 8:
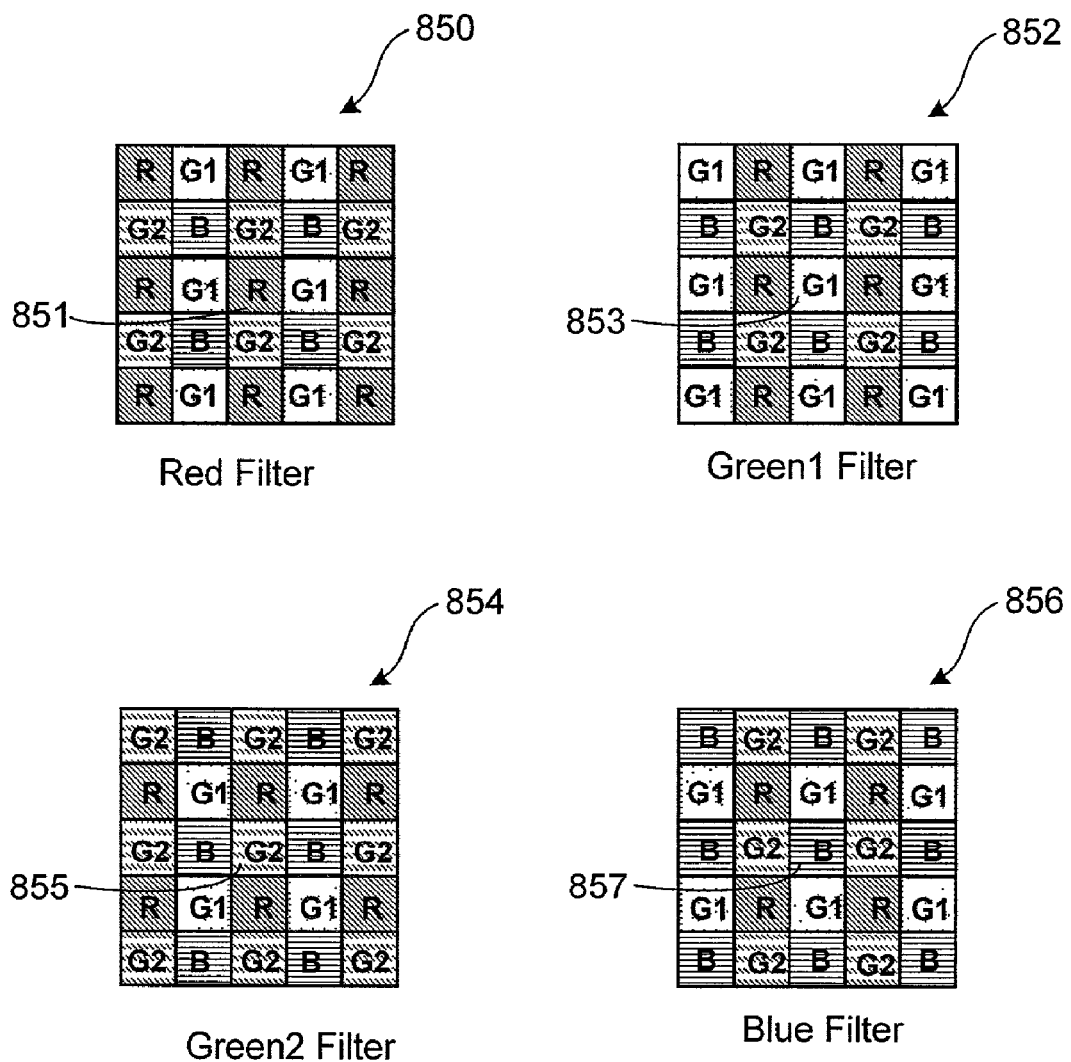
FIG. 8 illustrates four 5×5 neighborhood of pixels overlaid with a Bayer filter pattern in an image sensor of interest.

Referring to FIG. 5 where sensor data 210 is overlaid with a four-color Bayer pattern, when a 5×5 convolution kernel is applied for interpolating the full color image in the red plane, four convolution kernels will be applied to estimate the red color pixel value at each pixel, each kernel corresponding to one filter type in the filter pattern. For example, a convolution kernel for the red color filter is used to estimate the red color pixel value at a center pixel overlaid with a red filter (such as pixel 212) and a convolution kernel for the green1 color filter is used to estimate the red color pixel value at a center pixel overlaid with a green1 filter (such as pixel 214). FIG. 8 illustrates the filter pattern configuration for the four different convolution kernels for the four filter types.

When two convolution kernels are specified by minimizing the mean square errors, the two convolution kernels may each achieve a very small error in transforming the actual sensor data to the ideal sensor data. However, the two convolution kernels may give different interpolated pixel values even under the same stimulus condition. Under the identical stimulus conditions, the convolution kernel for the red color filter will generally give a better estimation of the red color pixel value than the convolution kernel for the blue color filter. The difference in the estimation of the red color pixel values between the two convolution kernels will be more noticeable in the full color image than the absolute error introduced by the convolution kernel for the blue color filter. Thus, the full color image may not be visually pleasing even though the transformation is mathematically precise.

The inventors of the present invention recognize the importance of requiring that convolution kernels for different filter types of a filter pattern all give the same estimation for a particular color plane under the same stimulus. Instead of specifying convolution kernels so that each kernel gives the best estimate (least error) of the pixel value for that filter, it is more important to provide convolution kernels that work in conjunction with each other to provide a visually pleasing full color image, even if it means giving up some precision in the individual transformation.

In summary, in designing the constraint matrix, constraints are selected so that certain imaging requirements are never violated and a visually pleasing image can be realized. Minimizing mean square error is performed within the confine of the constraint conditions. By selecting the appropriate constraints, a set of meaningful and useful coefficients can be obtained.

Turning now to the use of the Constraint Matrix to reduce the computational burden in solving for the coefficients. As described above, the coefficient computation method of the present invention computes coefficients for a set of convolution kernels simultaneously. Without the use of constraint conditions, the brute-force computation for the simultaneous solution of all the coefficients would be prohibitively complex.

Referring to Equation (4) above, the Constraint Matrix is introduced so that each coefficient can be expressed as a weighted sum of a set of free parameters in the Parameters Matrix. When sufficient constraint conditions are applied, the number of free parameters can be severely limited. In one example, when 20 or more constraint conditions are applied, the number of free parameters, k, can be reduced to 7. The parameter values can be solved for readily since their numbers are a lot fewer than the number of coefficients.

Designing a Constraint Matrix

The process for designing a Constraint Matrix will now be described. First, one or more constraints is selected. The constraints are selected based on the requirements and the nature of the imaging application to which the coefficients are applied. Exemplary constraints are described in more detail below. For the purpose of the present discussion, it is assumed that the color uniformity constraint is selected. The color uniformity constraint requires that given a uniform area of color, a set of convolution kernels for a filter pattern should all return the same interpolated pixel values.

Second, restrictions on the coefficients relating to the selected constraints are specified based on observations of the stimulus. In the case of a uniform area of color, every pixel in a given color plane should have the same pixel value, regardless of the color filter pattern and the placement of the color filter having the same color as the given color plane. Thus, a restriction can be specified requiring that the sum of the coefficients associated with the red filters in one kernel be equal to the sum of the coefficients associated with the red filters in another kernel, regardless of the actual number of red filters in each kernel. Similar restrictions can be specified for the other color filters.

FIG. 8 illustrates four 5×5 neighborhood of pixels overlaid with a Bayer filter pattern in an image sensor of interest. As shown in FIG. 8, the 5×5 neighborhoods of pixels surrounding each center pixel are each overlaid with a different filter pattern. For instance, pixel array 850 has a center pixel 851 overlaid with a red filter. A convolution kernel applied to pixel array 850 will be referred to as a red-filter convolution kernel. Pixel array 852 has a center pixel 853 adjacent to pixel 851 and overlaid with a green1 filter. A convolution kernel applied to pixel array 852 will be referred to as a green1-filter convolution kernel. Pixel array 850 includes 9 red filters while pixel array 852 includes only 6 red filters. The uniform color constraint will require that the coefficients for the red filters in the red-filter convolution kernel to have the same sum as the coefficients for the red filters in the green1-filter convolution kernel.

Next, a set of linear equations expressing the restrictions (the constraint conditions) based on the selected constraints can be written out. The following three equations define the uniform color constraint for the red color plane in the full color image. In the present description, pixel locations in each pixel array in FIG. 8 are denoted as number 1 to 25 from the lower-left pixel location to the upper right pixel location. The notation "R-2" refers to the coefficient at pixel location "2" in the red-filter convolution kernel (for pixel array 850). Pixel location 2 is the second pixel from the left in the bottom row of pixel array 850 while pixel location 22 is the second pixel from the left in the top row of pixel array 850. The uniform color constraint requires that coefficients for the red filter add up to the same value in each of the four convolution kernels. The three linear equations for this restriction can be written as:

$$R\text{-}1+R\text{-}3+R\text{-}5+R\text{-}11+R\text{-}13+R\text{-}15+R\text{-}21+R\text{-}23+R\text{-}25=G1\text{-}2\\+G1\text{-}4+G1\text{-}12+G1\text{-}14+G1\text{-}22+G1\text{-}24;$$

$$G2-6+G2-8+G2-10+G2-16+G2-18+G2-20=$$
$$G1-2+G1-4+G1-12+G1-14+G1-22+G1-24;$$
and $$B-7+B-9+B-17+B-19=G1-2+G1-4+G1-12+G1-14+G1-22+G1-24.$$

To ensure uniform color for all color planes, three other equations can be written each for the green1 filter, for the green2 filter, and for the blue filter. Each set of three equations ensure that the contribution of from one color filter is the same across all four convolution kernels in order to achieve color uniformity. As a result, a set of 12 linear equations with 100 variables (the coefficients) expressing the constraint conditions is derived. The set of 12 linear equations includes 88 independent variables and 12 dependent variables.

Next, the set of linear equations is solved for in terms of the independent variables. Then, the 100 variables (coefficients) can be written as a linear combination of the 88 independent variables.

If the uniform color constraint is the only constraint being imposed, then the Constraint Matrix can be written as a set of 100 equations describing the 100 variables (coefficients) in 88 parameters. However, in most cases, multiple number of constraints are used so as to increase the number of linear equations and decrease the number of parameters. Each of the linear equations is written by expressing certain sums of coefficients in certain kernel to be equal to certain sums of coefficients in another kernel. When all the linear equations for all of the selected constraints are written out, the number of parameters can be reduced significantly. Specifically, the relationship between the number of linear equations and the number of parameters is given as follows:

| No. of parameters = | No. of Coefficients − No. of Constraining linear Equations. |
|---|---|

In one embodiment, 6 primary constraints are used to produce 93 linear equations. For a 5×5 convolution kernel and 4 filter types in a filter pattern, the number of parameters (independent variables) is only 7 (100−93). The set of 93 linear equations can then be solved for in terms of the 7 independent variables. The Constraint Matrix is constructed by writing the 100 coefficients as a linear combination of the 7 parameters. That is, each coefficient is expressed as follows:

$$C=aP1+bP2+cP3+dP4+eP5+fP6+gP7,$$

where C denotes any one of 100 (n×n×f) coefficients, P1 to P7 denote the seven parameters, and a to g are the dependent variables computed based on the set of 93 linear equations. When the equation above is written for all 100 coefficients, the Constraint Matrix is constructed by transforming the 100 coefficients equations to a matrix representation as shown in Equation (4).

In summary, for a set of f n×n convolution kernels, a Constraint Matrix is derived by selecting a set of constraints and expressing the constraints in linear equations in terms of the n×n×f coefficients describing the constraint conditions. By including a sufficient number of constraints and linear equations, the number of independent variables (parameters) can be reduced to be much less than the number of coefficients. Then, the set of linear equations is solved for in terms of the independent variables (parameters). Next, the n×n×f coefficients are written out as linear combinations of the parameters (the independent variables). The Constraint Matrix is constructed by transforming the n×n×f linear combinations to a matrix representation in the form of Equation (4). That is, the n×n×f linear combinations are written as C=CT*P, where C is the coefficient matrix, CT is the Constraint Matrix and P is the Parameters Matrix.

Types of Constraints

The types of constraints used depends largely on the imaging application. In some applications, it is desirable to achieve color uniformity. In other applications, it may be desirable to introduce a gain in the sensor data during the interpolation process. In the following description, constraints which are useful in imaging applications are discussed. The constraints discussed herein are illustrative only and are provided to inform the process for designing the Constraint Matrix for use in the coefficient computation method of the present invention. An imaging scientist, upon being apprised of the present invention, would know how to select appropriate constraints for use in a specific imaging application and also would know how to formulate a constraint matrix using the selected constraints based on the discussion herein.

In the following discussion, a 5×5 neighborhood of pixels is assumed so that a convolution kernel has 25 coefficients. One of ordinary skill in the art would appreciate that the design methodology for the Constraint Matrix discussed below can be applied to any n×n neighborhood of pixels.

Spatial Symmetry

Most filter patterns used in image sensors are spatially symmetric. For example, the Bayer pattern of color filters shown in FIG. 1 exhibits symmetry in both the vertical and the horizontal directions. To ensure a pleasing image, the coefficients for each convolution kernel must exhibit the same spatial symmetry as that of the filter pattern.

Figure 2:
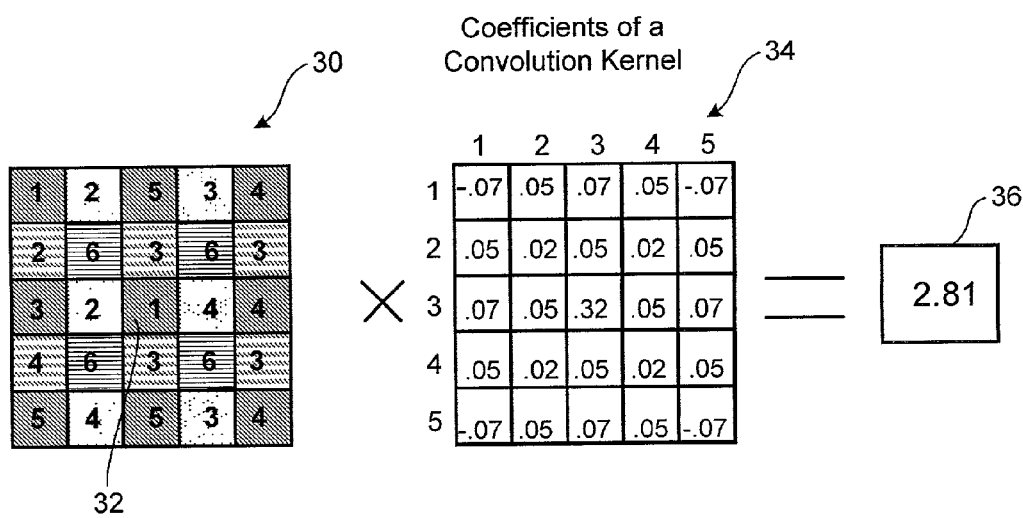
FIG. 2 illustrates the interpolation process for computing an interpolated pixel value.

To impose spatial symmetry in the coefficients, a constraint condition can be defined to require that the coefficient values for a set of corresponding pixel locations in the n×n neighborhood of pixels be equal. The spatially symmetry constraint will be explained with reference to convolution kernel 34 in FIG. 2. In FIG. 2, each pixel location in convolution kernel 34 is denoted by a coordinate (r,c) where r represents the row number and c represents the column number.

To realize spatial symmetry, the coefficient at pixel location (1,3) must be the same as the coefficient at pixel location (5,3). To further restrain the spatial symmetry, additional constraint conditions can be introduced to require that coefficients at pixel locations (1,3), (3,1), (5,3), and (3,5) be equal to each other. This constraint condition can be expressed in the Constraint Matrix by setting the corresponding locations in the Constraint Matrix to the same value while setting all other locations to a value of zero.

Figure 7:
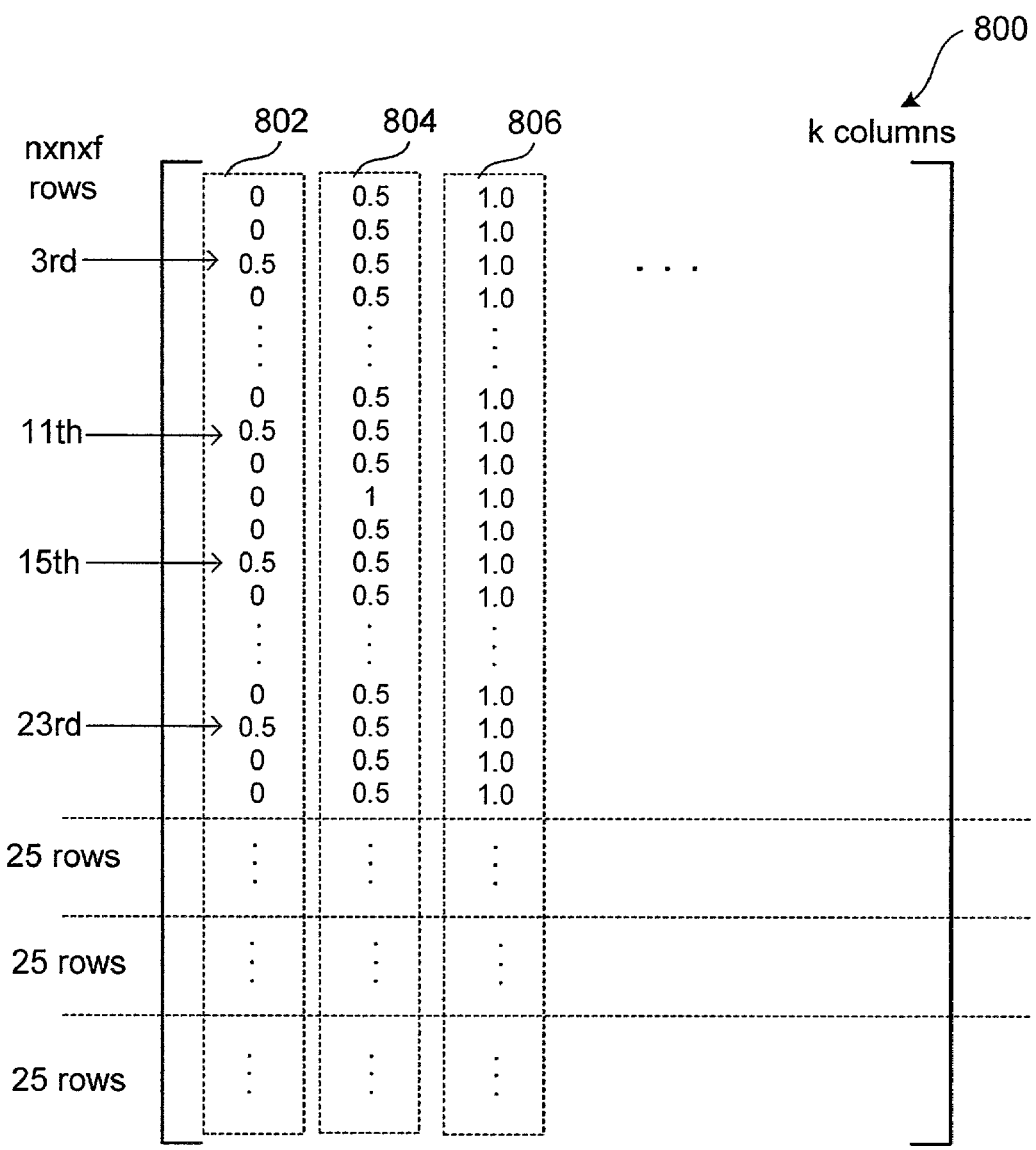
FIG. 7 illustrates a Constraint Matrix according to one embodiment of the present invention and includes several constraint conditions described herein.

FIG. 7 illustrates a Constraint Matrix according to one embodiment of the present invention and includes several constraint conditions described herein. Referring to FIG. 7, the constraint condition for the spatial symmetry constraint is expressed in column 802 of constraint matrix 800. In FIG. 7, the spatial symmetry constraint requires that coefficients at pixel locations (1,3), (3,1), (5,3), and (3,5) be equal. The constraint condition is expressed by placing a given value, such as 0.5, at each location in column 802 corresponding to the above-identified pixel locations. Thus, in column 802, a constraint value of 0.5 is placed at the third, the eleventh, the fifteenth and the twenty-third rows while a value of zero is placed at other location of the first 25 rows corresponding to the first convolution kernel.

Constraint matrix 800 defines constraints for f convolution kernels simultaneously. Thus, constraint matrix 800 has n×n×f number of rows which is 100 rows in the present illustration. Every 25 rows of constraint matrix 800 define the constraint condition for one filter type in the filter pattern. Thus, the same constraint condition can be applied to all filter type at the same time or a constraint condition can be applied to one filter type but not another.

In the present description, the spatial symmetry constraint is to be applied to all the other filter types. Thus, the values in the first 25 rows of column 802 are repeated for the next three groups of 25 rows in constraint matrix 800. In this manner, a first constraint for spatial symmetry is defined in constraint matrix 800.

Relative Coefficient Values

The values used in the constraint matrix is indicative of the relative value of the coefficients, not the actual values of the coefficients. Two values that are equal in a column of constraint matrix 800 indicate that the two corresponding coefficients are also equal. In some application, it may be desirable to design a constraint in which one specific coefficient, such as the coefficient for the center pixel, is larger than all other coefficients (e.g. twice as large). In this case, the value in the Constraint Matrix for that center pixel can be set to a value of "1" while the values for the other pixel locations can be set to "0.5." This constraint condition is illustrated in column 804 of constraint matrix 800 in FIG. 7.

In other applications, it may be desirable to have all coefficients for a particular filter to be of the same value. Such a constraint can be expressed as a column of 1's in the Constraint Matrix (illustrated as column 806 in FIG. 7). Other variation of coefficient values can also be designed. For example, it may be desirable to have coefficients in columns 1, 3 and 5 of the convolution kernel to be equal. In another example, it may be desirable to have coefficients in columns 2 and 4 of the convolution kernel to be equal. These constraint conditions can be incorporated into two columns of constraint matrix 800, each columns containing values of "1" where the coefficients are to be equal and constraint values of "0" where the coefficients are not to be the same.

Color Uniformity

In a full color image, uniform areas of image color must remain uniform. For example, a white wall should appear as uniformly white in the full color image. However, because adjacent pixel locations in the image sensor are overlaid with different filter type and have a different filter pattern in the n×n neighborhood of pixels, interpolation of pixel values may result in adjacent pixel locations having slightly different values so that the white wall does not appear as uniformly white.

Referring to FIG. 8, pixel array 850 has a center pixel 851 overlaid with a red filter. Pixel array 852 has a center pixel 853 adjacent to pixel 851 and overlaid with a green1 filter. The 5×5 neighborhoods of pixels surrounding each center pixel are overlaid with a different filter pattern. For instance, pixel array 850 includes 9 red filters, 6 green1 filters, 6 green 2 filters and 4 blue filters. On the other hand, pixel array 852 includes 6 red filters, 9 green1 filters, 4 green2 filters and 6 blue filters. To ensure color uniformity across center pixels 851 and 853, the interpolated pixel values for the two center pixels must equal so that the adjacent pixels have the same color in the final image.

To preserve color uniformity, a constraint condition can be designed to ensure that coefficients for each color filter add up to the same value in each of the four different convolution kernels for the four different color filters. For example, in the red filter convolution kernel for pixel array 850 and the green1 filter convolution kernel for pixel array 852, the coefficients for the nine red filters in the red filter convolution kernel should add up to the same sum as the coefficients for the six red filters in the green1 filter convolution kernel. In this manner, the nine red color filters in pixel array 850 contribute the same amount of intensity values to center pixel 851 as the six red color filters in pixel array 852 contribute to center pixel 853. The resultant image does not suffer from spatial variation in colors caused by the spatial variation of the filter patterns. The resulting image is much more visually pleasing.

Summation to a Set Gain

In calculating an interpolated pixel value, an n×n neighborhood of pixel values are matrix multiplied with the coefficients of a convolution kernel and then the products are added together to give the interpolated pixel value. It is important to ensure that the convolution kernel for each color filter does not contribute different amount of gain to the full color image. Thus, another constraint condition can be defined which requires that the summation of all coefficients in each of the convolution kernels to be equal to a fixed value, such as one. In the manner, each convolution kernel contributes the same amount to the full color image and each color filter will not become exaggerated or diminished so as to distort the final image. In some situations, it may be desirable to introduce an overall gain to the color image. In that case, the sum of the coefficients in each of the convolution kernels can be set to a value of 2 or higher to obtain the desired gain.

In one implementation, when a set gain constraint is used, the constraint matrix is designed to include the constraint condition where all coefficients add up to a value of zero and the ideal sensor data are preconditioned by subtracting the set gain from the ideal sensor data prior to applying the least square regression method. This implementation simplifies the design of the set gain constraint.

Edge Uniformity

Edges are features in an image where spatial changes occur only in one direction. For example, an edge occurs between two areas of uniform color. The image is spatially varying across the edge, but is uniform along the edge. Edge uniformity must be preserved in interpolating pixel values so that edges in the resulting image do not appear as a checkerboard.

When edge uniformity is desired, a constraint for edge uniformity can be specified in the Constraint Matrix. The edge uniformity constraint operates in the same manner as the color uniformity constraint. Basically, the coefficients are designed so that along an edge, the coefficients for a given color filter in one convolution kernel must add up to the same sum as the coefficients for the same color filter in another convolution kernel. The constraint should be designed to ensure that edges that run in either the vertical, horizontal or diagonal direction will be uniform in color.

The operation of the edge uniformity constraint is explained with reference to FIG. 5. Assume in FIG. 5 that an edge runs vertically down a pixel column 216, the constraint will ensure that the interpolated pixel values for pixel 218 is the same as the interpolated pixel values for pixel 220. In the 5×5 neighborhood of pixels where pixel 218 is the center pixel, three red color filters along column 216 contribute to pixel value of center pixel 218 which is overlaid with one of the red filters. However, for the next pixel 220 which is overlaid with a green2 filter, the 5×5 neighborhood of pixels where pixel 220 is the center pixel includes only two red filters. The constraint condition for edge uniformity is designed so that the sum of the coefficients for the three red filters in the red filter convolution kernel used by pixel 218 is the same as the sum of the coefficients for the two red filters in the green2 filter convolution kernel used by pixel 220. Similar constraint conditions can be designed for other filter color combinations (such as between the blue and green2 convolution kernels) and for edges running in the horizontal and diagonal directions. In this manner, coefficients are provided which preserve edge uniformity in the full color image.

An Exemplary Constraint Matrix

By introducing a sufficient number of constraints, the number of free parameters can be severely limited so that the n×n×f coefficients are expressed as linear equations involving only a limited number of unknowns (free parameters). An exemplary Constraint Matrix using twenty five constraint conditions and ninety-three linear equations, resulting in seven free parameters, is shown below:

```
[  1/4,    0,    0,    0,    0, -1/12,    0 ]
[    0,    0,    0,  1/4,    0,     0, -1/4 ]
[    0,    0,    0,    0,    0,   1/6,    0 ]
[    0,    0,    0,  1/4,    0,     0, -1/4 ]
[  1/4,    0,    0,    0,    0, -1/12,    0 ]
[ -1/4, -3/8, -1/4, -1/4, -1/4,  -1/4,    0 ]
[    0,    0,  1/4,    0,  1/4,     0,    0 ]
[    0,  3/4,    0,    0,    0,     0,    0 ]
[    0,    0,  1/4,    0,  1/4,     0,    0 ]
[ -1/4, -3/8, -1/4, -1/4, -1/4,  -1/4,    0 ]
[    0,    0,    0,    0,    0,   1/6,    0 ]
[    0,    0,    0,    0,    0,     0,  1/2 ]
[    0,    0,    0,    0,    0,   2/3,    0 ]
[    0,    0,    0,    0,    0,     0,  1/2 ]
[    0,    0,    0,    0,    0,   1/6,    0 ]
[ -1/4, -3/8, -1/4, -1/4, -1/4,  -1/4,    0 ]
[    0,    0,  1/4,    0,  1/4,     0,    0 ]
[    0,  3/4,    0,    0,    0,     0,    0 ]
[    0,    0,  1/4,    0,  1/4,     0,    0 ]
[ -1/4, -3/8, -1/4, -1/4, -1/4,  -1/4,    0 ]
[  1/4,    0,    0,    0,    0, -1/12,    0 ]
[    0,    0,    0,  1/4,    0,     0, -1/4 ]
[    0,    0,    0,    0,    0,   1/6,    0 ]
[    0,    0,    0,  1/4,    0,     0, -1/4 ]
[  1/4,    0,    0,    0,    0, -1/12,    0 ]
[ -1/4, -1/2, -1/4, -1/4, -1/4,  -1/4,    0 ]
[    0,    0,  1/4,    0,    0,     0,    0 ]
[    0,  1/4,    0,    0,    0,     0,    0 ]
```

-continued
```
[    0,    0,  1/4,    0,    0,     0,    0 ]
[ -1/4, -1/2, -1/4, -1/4, -1/4,  -1/4,    0 ]
[  1/4,    0,    0,    0,    0,     0,    0 ]
[    0,    0,    0,  1/4,    0,     0,    0 ]
[    0,    0,    0,    0,    0,   1/2,    0 ]
[    0,    0,    0,  1/4,    0,     0,    0 ]
[  1/4,    0,    0,    0,    0,     0,    0 ]
[    0,  1/4,    0,    0,    0,     0,    0 ]
[    0,    0,    0,    0,    0,   1/2,    0 ]
[    0,    1,    0,    0,    0,     0,    0 ]
[    0,    0,    0,    0,    0,   1/2,    0 ]
[    0,  1/4,    0,    0,    0,     0,    0 ]
[  1/4,    0,    0,    0,    0,     0,    0 ]
[    0,    0,    0,  1/4,    0,     0,    0 ]
[    0,    0,    0,    0,    0,   1/2,    0 ]
[    0,    0,    0,  1/4,    0,     0,    0 ]
[  1/4,    0,    0,    0,    0,     0,    0 ]
[ -1/4, -1/2, -1/4, -1/4, -1/4,  -1/4,    0 ]
[    0,    0,  1/4,    0,    0,     0,    0 ]
[    0,  1/4,    0,    0,    0,     0,    0 ]
[    0,    0,  1/4,    0,    0,     0,    0 ]
[ -1/4, -1/2, -1/4, -1/4, -1/4,  -1/4,    0 ]
[    0,    0,    0,  1/4,    0,     0, -1/3 ]
[  1/4,    0,    0,    0,    0,     0,    0 ]
[    0,    0,    0,    0,    0,     0,  1/6 ]
[  1/4,    0,    0,    0,    0,     0,    0 ]
[    0,    0,    0,  1/4,    0,     0, -1/3 ]
[    0,    0,  1/4,    0,    0,     0,    0 ]
[ -1/4,    0, -1/4, -1/4, -1/4,  -1/4,    0 ]
[    0,    0,    0,    0,  1/2,     0,    0 ]
[ -1/4,    0, -1/4, -1/4, -1/4,  -1/4,    0 ]
[    0,    0,  1/4,    0,    0,     0,    0 ]
[    0,    0,    0,    0,    0,     0,  1/6 ]
[    0,    0,    0,    0,    0,   1/2,    0 ]
[    0,    0,    0,    0,    0,     0,  2/3 ]
[    0,    0,    0,    0,    0,   1/2,    0 ]
[    0,    0,    0,    0,    0,     0,  1/6 ]
[    0,    0,  1/4,    0,    0,     0,    0 ]
[ -1/4,    0, -1/4, -1/4, -1/4,  -1/4,    0 ]
[    0,    0,    0,    0,  1/2,     0,    0 ]
[ -1/4,    0, -1/4, -1/4, -1/4,  -1/4,    0 ]
[    0,    0,  1/4,    0,    0,     0,    0 ]
```

-continued

```
[   0,    0,    0,  1/4,     0,    0, -1/3 ]
[ 1/4,    0,    0,    0,     0,    0,    0 ]
[   0,    0,    0,    0,     0,    0,  1/6 ]
[ 1/4,    0,    0,    0,     0,    0,    0 ]
[   0,    0,    0,  1/4,     0,    0, -1/3 ]
[   0,    0,  1/4,    0, -1/12,    0,    0 ]
[-1/4, -3/8, -1/4, -1/4,  -1/4, -1/4,    0 ]
[   0,    0,    0,    0,   1/6,    0,    0 ]
[-1/4, -3/8, -1/4, -1/4,  -1/4, -1/4,    0 ]
[   0,    0,  1/4,    0, -1/12,    0,    0 ]
[   0,    0,    0,  1/4,     0,    0, -1/4 ]
[ 1/4,    0,    0,    0,     0,  1/4,    0 ]
[   0,    0,    0,    0,     0,    0,  1/2 ]
[ 1/4,    0,    0,    0,     0,  1/4,    0 ]
[   0,    0,    0,  1/4,     0,    0, -1/4 ]
[   0,    0,    0,    0,   1/6,    0,    0 ]
[   0,  3/4,    0,    0,     0,    0,    0 ]
[   0,    0,    0,    0,     0,  2/3,    0 ]
[   0,  3/4,    0,    0,     0,    0,    0 ]
[   0,    0,    0,    0,   1/6,    0,    0 ]
[   0,    0,    0,  1/4,     0,    0, -1/4 ]
[ 1/4,    0,    0,    0,     0,  1/4,    0 ]
[   0,    0,    0,    0,     0,    0,  1/2 ]
[ 1/4,    0,    0,    0,     0,  1/4,    0 ]
[   0,    0,    0,  1/4,     0,    0, -1/4 ]
[   0,    0,  1/4,    0, -1/12,    0,    0 ]
[-1/4, -3/8, -1/4, -1/4,  -1/4, -1/4,    0 ]
[   0,    0,    0,    0,   1/6,    0,    0 ]
[-1/4, -3/8, -1/4, -1/4,  -1/4, -1/4,    0 ]
[   0,    0,  1/4,    0, -1/12,    0,    0 ]
```

The exemplary Constraint Matrix shown above incorporates the following constraints: spatial symmetry, zero gain, color uniformity, vertical edge uniformity, horizontal edge uniformity and diagonal edge uniformity. The constraints can be expressed as a set of linear equations expressing the constraint conditions (restrictions) imposed on the coefficients in each of the f convolution kernels. In the present illustration, a set of 25 linear equations are written to express the constraint conditions on the coefficients.

To simplify the representation of the linear equations, the spatial symmetry constraint is first applied to limit the number of different coefficients. Specifically, for a 5×5 convolution kernel, instead of denoting each coefficient location from 1 to 25 as described above with reference to FIG. 8, the spatial symmetry can be applied to limit the number of different coefficient values to 8 only in each of the convolution kernel, as illustrated by the coefficient configuration in the 5×5 convolution kernel below:

```
r1 r2 r3 r2 r1
r4 r5 r6 r5 r4
r3 r7 r8 r7 r3
r4 r5 r6 r5 r4
r1 r2 r3 r2 r1
``` where "r" denotes the coefficients for the red-filter convolution kernel and the variables r1 to r8 denotes the eight different coefficient values in the convolution kernel. When the spatial symmetry constraint is applied, the coefficients at the four corners of the convolution kernel should be the same (r1), the coefficients at the center of the four edges should be the same (r3), etc. Thus, only 8 variables are needed to denote the twenty-five coefficients in a given convolution kernel. The same coefficient configuration can be written for the green1-filter, the green2-filter and the blue filter convolution kernel. Note that in the following description, the coefficients for the green1-filter convolution kernel are denoted as g1k, where k is an integer from 1 to 8. Similarly, the coefficients for the green2-filter convolution kernel are denoted as g2k, where k is an integer from 1 to 8. Thus, the coefficient g12 refers to the second variable in the g1 filter, not the twelve variable.

The coefficient configurations described above restrict the coefficients to meet the spatial symmetry constraint. Given the coefficient configuration above, the constraint conditions relating to the other constraints can be expressed as linear equations in terms of the coefficients as follows:

Zero Gain Constraint:

$$g11+g12+g13+g14+g15+g16+g17+g18=1; \qquad (1)$$

Color Uniformity Constraint:

$$r1+r3+r8=g12+g17; \qquad (2)$$

$$r2+r7=g11+g13+g18; \qquad (3)$$

$$r4+r6=g15; \qquad (4)$$

$$r5=g14+g16; \qquad (5)$$

$$g24+g26=g12+g17; \qquad (6)$$

$$g25=g11+g13+g18; \qquad (7)$$

$$g22+g27=g14+g16; \qquad (8)$$

$$g21+g23+g28=g15; \qquad (9)$$

$$b5=g12+g17; \qquad (10)$$

$$b4+b6=g11+g13+g18; \qquad (11)$$

$$b1+b3+b8=g14+g16; \qquad (12)$$

$$b2+b7=g15; \qquad (13)$$

Vertical and Horizontal Edge Constraint:

$$\tfrac{1}{2}*r3+r8=g17; \qquad (14)$$

$$\tfrac{1}{2}*r3+r8=g26; \qquad (15)$$

$$r7=\tfrac{1}{2}*g13+g18; \qquad (16)$$

$$r6=\tfrac{1}{2}*g23+g28; \qquad (17)$$

$$\tfrac{1}{2}*g23+g28=b7; \qquad (18)$$

$$g27=\tfrac{1}{2}*b3+b8; \qquad (19)$$

$$b6 = \tfrac{1}{2}*g13 + g18; \quad (20)$$

$$\tfrac{1}{2}*b3 + b8 = g16; \quad (21)$$

Diagonal Edge Constraint:

$$\tfrac{1}{2}*r1 + r8 = \tfrac{1}{2}*b5; \quad (22)$$

$$\tfrac{1}{2}*r5 = \tfrac{1}{2}*b1 + b8; \quad (23)$$

$$\tfrac{1}{2}*g25 = \tfrac{1}{2}*g11 + g18; \quad (24)$$

$$\tfrac{1}{2}*g21 + g28 = \tfrac{1}{2}*g15; \quad (25)$$

By the use of the spatial symmetry constraint, the number of variables to be solved for is reduced from 100 (n×n×f) down to 32 (8 variables for each of the 4 convolution kernel). By providing the 25 linear equations above, the number of parameters (independent variables) remains to be solved for is 32−25=7. Alternately, the spaital symmetry constraint provides 68 linear equations and together with the 25 linear equations given above, 93 linear equations are provided based on the 6 primary constraints. To compute the 100 coefficients, the number of parameters remains to be solved for is 100−93=7.

To form the Constraint Matrix, the twenty five equations are solved for in terms of the 7 independent variables. Then, the 100 coefficients can then be expressed as linear combinations of the 7 independent variables. Thus, in the present example, 6 primary constraints are applied to yield 93 linear equations so that the number of independent variables to be solved for in the coefficient computation method reduces from 100 to just 7. The use of the Constraint Matrix has the effect of greatly reducing the computational burden while ensuring that the final image will meet predefined imaging requirements.

When the Constraint Matrix shown above is used to generate coefficients for a set of convolution kernels for interpolating pixel values, the coefficients can be used to provide a very high quality and visually pleasing full color image. Such imaging result can not be readily achieved in conventional coefficient computation methods.

Summary and Advantages

When coefficient computation method of the present invention is used to define coefficients for a set of convolution kernels for use in interpolating pixel values, a set of useful and meaningful coefficients can be derived for achieving a high quality full color image. The advantages of the coefficient computation method of the present invention are numerous and will be summarized below.

First, the coefficient computation method allows a set of coefficients to be defined so that a "desired" color pixel can be created. The desired color pixel may be sharpened to account for blurring induced by the lens system of the imaging device. The desired color pixel may be corrected for distortion introduced by the image sensor or the lens system, such as noise, cross-talk, and lens blur. Thus, a set of coefficients can be defined such that color sharpening and pixel value reconstruction can be carried out in one interpolation step.

Second, the method of the present invention defines coefficients for transforming sensor data captured using a filter pattern in one color system to a full color image expressed in another color system. For example, the image sensor may be overlaid with a RGB filter pattern while a full color image in the Y/Cb/Cr color space is desired. The method of the present invention provides flexibility and can be applied to a wide range of imaging devices employing different filter patterns and different color system in the full color image.

Third, by introducing constraints through the Constraint Matrix, coefficients are chosen so that pixel values for the different filters in the filter pattern can be balanced out, instead of optimizing within one filter color only. This result is not achievable in the conventional methods.

Fourth, the introduction of the Constraint Matrix provides a user with significant control over the coefficients so that certain desired image quality can be preserved. The conventional methods of minimizing least square errors in deriving coefficients often produce images with objectionable spatial variations so that the images are often not visually pleasing. By using the Constraint Matrix in accordance with the present invention, coefficients which produce a smoother and more visually pleasing image can be obtained. Least square regression is used only to solve for a small number of free parameters.

Fifth, the conventional method of computing coefficients can be very computational intensive. In accordance with the present invention, the introduction of the Constraint Matrix effectively reduces the number of unknown parameters required to be solved for. In the above example, instead of solving for the 100 coefficients, the Constraint Matrix limits the number of free parameters to 10 or less. The method of the present invention thus significantly reduces the computational burden and can be run very quickly on conventional personal computers.

In the above description, the coefficient computation method of the present invention is described with reference to defining coefficients for interpolating pixel values for deriving a full color image. The method of the present invention can be used to define convolution kernels for applications other than reconstructing a full color image. For example, interpolation may be performed to reconstruct the pixel value of a dead or unusable pixel in an image sensor. Interpolation may also be performed as a way to artificially upsample the sensor data to a higher resolution. The coefficient computation method of the present invention has applications in all these image processing operations.

Alternate Embodiments

According to another embodiment of the present invention, the coefficient computation method provides coefficients for interpolating pixel values from pixel array 10 to a Y/Cb/Cr color system such that the luminance information is sharpened while the chrominance information is burred out. Sharpening and blurring out are well known image processing techniques for enhancing the quality of an image, making the image more visually pleasing to the human eyes.

In the present embodiment, the coefficient computation method of the present invention is applied to define coefficients for the Y color plane only while coefficients for the Cb and Cr color planes are defined manually with the purpose of blurring out the color. The coefficients for the Y color plane is defined by using only the Y color component of the ideal sensor data. The Constraint Matrix is defined in such a way so as to provide improved spatial information.

In the above descriptions, the neighborhood of pixels is selected to be symmetrical. That is, the neighborhood of pixels is an n×n pixel array. However, a symmetrical neighborhood of pixels is illustrative only. In other embodiments, the neighborhood of pixels can be defined to be asymmetrical, such as an m×n pixel array. However, in most applications, a symmetrical n×n neighborhood of pixels is used.

The above detailed descriptions are provided to illustrate specific embodiments of the present invention and are not intended to be limiting. Numerous modifications and variations within the scope of the present invention are possible. For example, the steps of listing all n×n neighborhoods of pixels in a Master Matrix (step 300 in FIG. 3) and the subsequent division of the Master Matrix into f Data Matrices based on the filter pattern (step 400 in FIG. 3) can be performed in one step by listing all n×n neighborhoods of pixels for each filter type separately to form the respective Data Matrices. The present invention is defined by the appended claims.

We claim:

1. A method for generating coefficients for a set of convolution kernels for use in interpolating pixel values in an image sensor, wherein said image sensor comprises a pixel array overlaid with a pattern of f selectively transmissive filters so that each pixel element of said pixel array is disposed to capture only one of a plurality of color spectra of visible light, said method comprising:

generating ideal sensor data representative of a test image in a first color plane, said test image comprising a plurality of colors;

generating sensor data of said test image, said sensor data indicative of an image of said test image captured using said image sensor, said sensor data being a two dimensional array of pixel data;

generating f data matrices, each data matrix comprising pixel data from a plurality of neighborhoods of pixels in said pixel array, each row of said data matrix including said pixel data of one neighborhood of pixels, each of said neighborhoods of pixels having m rows and n columns and surrounding a center pixel, wherein each data matrix includes pixel data corresponding to one of said f selectively transmissive filters superimposed on said center pixel of each neighborhood of pixels; and determining said coefficients for f convolution kernels using said ideal sensor data, said f data matrices and by applying one or more constraints.

2. The method of claim 1, wherein said generating f data matrices comprises:

generating a first matrix comprising said pixel data from said plurality of neighborhoods of pixels in said pixel array, each row of said first matrix including said pixel data of one neighborhood of pixels, each of said neighborhoods of pixels having m rows and n columns and surrounding a center pixel; and forming said f data matrices by dividing rows of said first matrix based on said f selectively transmissive filters superimposed on said center pixel of each neighborhood of pixels.

3. The method of claim 1, wherein said determining said coefficients comprises:

forming an diagonalized matrix using said f data matrices;

forming f ideal matrices based on said ideal sensor data, each of said f ideal matrices including ideal sensor data associated with a respective one of said f selectively transmissive filters superimposed on said center pixel of each neighborhood of pixels;

generating a constraint matrix based on said one or more constraints, said one or more constraints being expressed as linear equations in terms of one or more parameters;

multiplying said diagonalized matrix with said constraint matrix to generate a constrained data matrix;

determining using least square regression said one or more parameters based on said constrained data matrix and said ideal sensor data; and multiplying said constraint matrix and said one or more parameters to generate said coefficients.

4. The method of claim 3, wherein said forming an diagonalized matrix using said f data matrices comprises:

placing said f data matrices along a diagonal of said diagonalized matrix; and placing the value zero in entries not occupied by said f data matrices.

5. The method of claim 3, wherein said determining using least square regression said one or more parameters based on said constrained data matrix and said ideal sensor data comprises:

solving the matrix equation CM*P=I for P, wherein CM is said constrained data matrix, P is a matrix representing said one or more parameters and I is a matrix representing said f ideal matrices.

6. The method of claim 3, wherein said generating a constraint matrix based on said one or more constraints comprises:

selecting one or more constraints;

specifying restrictions on said coefficients for f convolution kernels based on said one or more constraints;

expressing said restrictions in one or more linear equations in terms of said coefficients;

solving said one or more linear equations in terms of said one or more parameters, said one or more parameters being independent variables of said one or more linear equations;

expressing each of said coefficients as a linear combination of said one or more parameters based on said one or more linear equations; and constructing said constraint matrix by transforming said linear combinations of said one or more parameters for all of said coefficients into a matrix representation.

7. The method of claim 6, wherein said constructing said constraint matrix comprises:

expressing said linear combinations as a matrix equation C=CT*P, where C is a matrix representing said coefficients for f convolution kernels, CT is said constraint matrix and P is a matrix representing said one or more parameters.

8. The method of claim 6, wherein said one or more constraints comprise any one of color uniformity, vertical edge uniformity, horizontal edge uniformity, diagonal edge uniformity, spatial symmetry, a zero gain and a set gain in said full color image.

9. The method of claim 6, wherein said expressing said restrictions in one or more linear equations comprises expressing said restrictions as a sum of a first set of coefficients in a first one of said f convolution kernels as being equal to a sum of a second set of coefficients in a second one of said f convolution kernels.

10. The method of claim 1, wherein said generating sensor data of said test image comprises capturing an image of said test image using said image sensor.

11. The method of claim 1, wherein said generating sensor data of said test image comprises generating said sensor data by simulating characteristics of said image sensor.

12. The method of claim 1, wherein said test image is a random color noise image.

13. The method of claim 1, wherein said coefficients are applied in interpolating pixel values for deriving pixel values for a full color image, and said one or more constraints define one or more characteristics of said full color image.

14. The method of claim 13, wherein said one or more characteristics comprise any one of color uniformity, edge uniformity, spatial symmetry, and a set gain in said full color image.

15. The method of claim 1, wherein said coefficients for f convolution kernels are applied in interpolating pixel values for deriving pixel values in a first color plane of a full color image, and said determining said coefficients is repeated to determine said coefficients for f convolution kernels for deriving pixel values in a second color plane of said full color image.

16. The method of claim 1, wherein said determining said coefficients for f convolution kernels comprises determining coefficients for f convolution kernels for a first color plane in a full color image and coefficients for f convolution kernels for a second color plane in said full color image simultaneously.

17. The method of claim 1, wherein each neighborhood of pixels in said pixel array is an n×n neighborhood of pixels.

18. The method of claim 17, wherein said n×n neighborhood of pixels is an 5×5 neighborhood of pixels.

19. The method of claim 1, wherein said coefficients for f convolution kernels are applied in interpolating pixel values for deriving pixel values in a first color plane of a full color image, said full color image being expressed in a first color space different than a color space of said f selectively transmissive filters.

20. The method of claim 19, wherein said full color image is expressed in a Y/Cb/Cr color space and said f selectively transmissive filters are expressed in a RGB color space.

* * * * *